US011838851B1

(12) United States Patent
Natarajan et al.

(10) Patent No.: US 11,838,851 B1
(45) Date of Patent: Dec. 5, 2023

(54) METHODS FOR MANAGING L7 TRAFFIC CLASSIFICATION AND DEVICES THEREOF

(71) Applicant: F5 Networks, Inc., Seattle, WA (US)

(72) Inventors: Ravi Natarajan, Fremont, CA (US); Saxon Amdahl, Mountain View, CA (US); Bipin Kumar, San Ramon, CA (US)

(73) Assignee: F5, Inc., Seattle, WA (US)

(*) Notice: Subject to any disclaimer, the term of this patent is extended or adjusted under 35 U.S.C. 154(b) by 0 days.

(21) Appl. No.: 14/800,223

(22) Filed: Jul. 15, 2015

Related U.S. Application Data

(60) Provisional application No. 62/024,906, filed on Jul. 15, 2014.

(51) Int. Cl.
*H04W 48/02* (2009.01)
*H04L 69/329* (2022.01)
*H04W 8/08* (2009.01)
*H04L 43/18* (2022.01)

(52) U.S. Cl.
CPC ............. *H04W 48/02* (2013.01); *H04L 43/18* (2013.01); *H04L 69/329* (2013.01); *H04W 8/08* (2013.01)

(58) Field of Classification Search
CPC ..... H04L 43/18; H04L 69/329; H04L 63/102; H04L 29/06; H04L 63/0218; H04L 63/0236; H04L 63/0263; H04L 63/04; H04L 63/0823; H04L 63/083; H04L 63/10; H04L 63/1408; H04L 63/1441; H04L 63/20; H04L 63/0227; H04L 65/1069; H04L 67/327; H04L 69/14; H04W 48/02; H04W 8/08; H04W 4/00; H04W 8/30
See application file for complete search history.

(56) References Cited

U.S. PATENT DOCUMENTS

| 3,950,735 A | 4/1976 | Patel |
| 4,644,532 A | 2/1987 | George et al. |
| 4,897,781 A | 1/1990 | Chang et al. |
| 4,965,772 A | 10/1990 | Daniel et al. |
| 4,993,030 A | 2/1991 | Krakauer et al. |
| 5,023,826 A | 6/1991 | Patel |
| 5,053,953 A | 10/1991 | Patel |

(Continued)

FOREIGN PATENT DOCUMENTS

| AU | 2003300350 A1 | 7/2004 |
| CA | 2080530 A1 | 4/1994 |

(Continued)

OTHER PUBLICATIONS

F5 Networks Inc., "Big-IP® TMOS®: Implementations" F5 Networks Inc., May 5, 2015, Version 11.4, pp. 1-234.

(Continued)

*Primary Examiner* — Ninos Donabed
(74) *Attorney, Agent, or Firm* — Troutman Pepper Hamilton Sanders LLP (F5 PATENTS)

(57) ABSTRACT

A method, non-transitory computer readable medium and device that assists with managing L7 network classification includes receiving a request to access a service by a mobile computing device. Next, application layer network traffic from the requesting mobile computing device is classified based on mobile data associated with the requesting mobile computing device. One or more actions are performed based on the classification.

9 Claims, 6 Drawing Sheets

(56) References Cited

U.S. PATENT DOCUMENTS

| | | |
|---|---|---|
| 5,167,024 A | 11/1992 | Smith et al. |
| 5,218,695 A | 6/1993 | Noveck et al. |
| 5,282,201 A | 1/1994 | Frank et al. |
| 5,299,312 A | 3/1994 | Rocco, Jr. |
| 5,303,368 A | 4/1994 | Kotaki |
| 5,327,529 A | 7/1994 | Fults et al. |
| 5,367,635 A | 11/1994 | Bauer et al. |
| 5,371,852 A | 12/1994 | Attanasio et al. |
| 5,406,502 A | 4/1995 | Haramaty et al. |
| 5,473,362 A | 12/1995 | Fitzgerald et al. |
| 5,475,857 A | 12/1995 | Dally |
| 5,511,177 A | 4/1996 | Kagimasa et al. |
| 5,517,617 A | 5/1996 | Sathaye et al. |
| 5,519,694 A | 5/1996 | Brewer et al. |
| 5,519,778 A | 5/1996 | Leighton et al. |
| 5,521,591 A | 5/1996 | Arora et al. |
| 5,528,701 A | 6/1996 | Aref |
| 5,537,585 A | 7/1996 | Blickenstaff et al. |
| 5,548,724 A | 8/1996 | Akizawa et al. |
| 5,550,816 A | 8/1996 | Hardwick et al. |
| 5,550,965 A | 8/1996 | Gabbe et al. |
| 5,581,764 A | 12/1996 | Fitzgerald et al. |
| 5,583,995 A | 12/1996 | Gardner et al. |
| 5,586,260 A | 12/1996 | Hu |
| 5,590,320 A | 12/1996 | Maxey |
| 5,596,742 A | 1/1997 | Agarwal et al. |
| 5,606,665 A | 2/1997 | Yang et al. |
| 5,611,049 A | 3/1997 | Pitts |
| 5,623,490 A | 4/1997 | Richter et al. |
| 5,649,194 A | 7/1997 | Miller et al. |
| 5,649,200 A | 7/1997 | Leblang et al. |
| 5,663,018 A | 9/1997 | Cummings et al. |
| 5,668,943 A | 9/1997 | Attanasio et al. |
| 5,692,180 A | 11/1997 | Lee |
| 5,721,779 A | 2/1998 | Funk |
| 5,724,512 A | 3/1998 | Winterbottom |
| 5,752,023 A | 5/1998 | Choucri et al. |
| 5,761,484 A | 6/1998 | Agarwal et al. |
| 5,761,534 A | 6/1998 | Lundberg et al. |
| 5,768,423 A | 6/1998 | Aref et al. |
| 5,774,660 A | 6/1998 | Brendel et al. |
| 5,790,554 A | 8/1998 | Pitcher et al. |
| 5,802,052 A | 9/1998 | Venkataraman |
| 5,806,061 A | 9/1998 | Chaudhuri et al. |
| 5,812,550 A | 9/1998 | Sohn et al. |
| 5,825,772 A | 10/1998 | Dobbins et al. |
| 5,828,835 A | 10/1998 | Isfeld et al. |
| 5,832,283 A | 11/1998 | Chou et al. |
| 5,832,496 A | 11/1998 | Anand et al. |
| 5,832,522 A | 11/1998 | Blickenstaff et al. |
| 5,838,970 A | 11/1998 | Thomas |
| 5,862,325 A | 1/1999 | Reed et al. |
| 5,875,296 A | 2/1999 | Shi et al. |
| 5,884,303 A | 3/1999 | Brown |
| 5,892,914 A | 4/1999 | Pitts |
| 5,892,932 A | 4/1999 | Kim |
| 5,893,086 A | 4/1999 | Schmuck et al. |
| 5,897,638 A | 4/1999 | Lasser et al. |
| 5,905,990 A | 5/1999 | Inglett |
| 5,917,998 A | 6/1999 | Cabrera et al. |
| 5,919,247 A | 7/1999 | Van Hoff et al. |
| 5,920,873 A | 7/1999 | Van Huben et al. |
| 5,930,474 A | 7/1999 | Dunworth et al. |
| 5,936,939 A | 8/1999 | Des Jardins et al. |
| 5,937,406 A | 8/1999 | Balabine et al. |
| 5,941,988 A | 8/1999 | Bhagwat et al. |
| 5,946,690 A | 8/1999 | Pitts |
| 5,949,885 A | 9/1999 | Leighton |
| 5,951,694 A | 9/1999 | Choquier et al. |
| 5,958,053 A | 9/1999 | Denker |
| 5,959,990 A | 9/1999 | Frantz et al. |
| 5,974,460 A | 10/1999 | Maddalozzo, Jr. et al. |
| 5,983,281 A | 11/1999 | Ogle et al. |
| 5,988,847 A | 11/1999 | Mclaughlin et al. |
| 5,991,302 A | 11/1999 | Berl et al. |
| 5,995,491 A | 11/1999 | Richter et al. |
| 5,999,664 A | 12/1999 | Mahoney et al. |
| 6,006,260 A | 12/1999 | Barrick, Jr. et al. |
| 6,006,264 A | 12/1999 | Colby et al. |
| 6,012,083 A | 1/2000 | Savitzky et al. |
| 6,026,443 A | 2/2000 | Oskouy et al. |
| 6,026,452 A | 2/2000 | Pitts |
| 6,026,500 A | 2/2000 | Topff et al. |
| 6,028,857 A | 2/2000 | Poor |
| 6,029,168 A | 2/2000 | Frey |
| 6,029,175 A | 2/2000 | Chow et al. |
| 6,041,365 A | 3/2000 | Kleinerman |
| 6,044,367 A | 3/2000 | Wolff |
| 6,047,129 A | 4/2000 | Frye |
| 6,047,356 A | 4/2000 | Anderson et al. |
| 6,051,169 A | 4/2000 | Brown et al. |
| 6,067,558 A | 5/2000 | Wendt et al. |
| 6,072,942 A | 6/2000 | Stockwell et al. |
| 6,078,929 A | 6/2000 | Rao |
| 6,078,956 A | 6/2000 | Bryant et al. |
| 6,085,234 A | 7/2000 | Pitts et al. |
| 6,088,694 A | 7/2000 | Burns et al. |
| 6,092,196 A | 7/2000 | Reiche |
| 6,104,706 A | 8/2000 | Richter et al. |
| 6,108,703 A | 8/2000 | Leighton et al. |
| 6,111,876 A | 8/2000 | Frantz et al. |
| 6,115,802 A | 9/2000 | Tock et al. |
| 6,119,234 A | 9/2000 | Aziz et al. |
| 6,128,279 A | 10/2000 | O'Neil et al. |
| 6,128,627 A | 10/2000 | Mattis et al. |
| 6,128,657 A | 10/2000 | Okanoya et al. |
| 6,128,717 A | 10/2000 | Harrison et al. |
| 6,144,962 A | 11/2000 | Weinberg |
| 6,154,777 A | 11/2000 | Ebrahim |
| 6,157,950 A | 12/2000 | Krishnan |
| 6,160,874 A | 12/2000 | Dickerman et al. |
| 6,161,145 A | 12/2000 | Bainbridge et al. |
| 6,161,185 A | 12/2000 | Guthrie et al. |
| 6,170,022 B1 | 1/2001 | Linville et al. |
| 6,178,423 B1 | 1/2001 | Douceur et al. |
| 6,181,336 B1 | 1/2001 | Chiu et al. |
| 6,182,139 B1 | 1/2001 | Brendel |
| 6,192,051 B1 | 2/2001 | Lipman et al. |
| 6,202,156 B1 | 3/2001 | Kalajan |
| 6,223,206 B1 | 4/2001 | Dan et al. |
| 6,233,612 B1 | 5/2001 | Fruchtman et al. |
| 6,233,648 B1 | 5/2001 | Tomita |
| 6,237,008 B1 | 5/2001 | Beal et al. |
| 6,169,987 B1 | 6/2001 | Knoblock et al. |
| 6,246,684 B1 | 6/2001 | Chapman et al. |
| 6,253,226 B1 | 6/2001 | Chidambaran et al. |
| 6,253,230 B1 | 6/2001 | Couland et al. |
| 6,256,031 B1 | 7/2001 | Meijer et al. |
| 6,259,405 B1 | 7/2001 | Stewart et al. |
| 6,260,070 B1 | 7/2001 | Shah |
| 6,263,368 B1 | 7/2001 | Martin |
| 6,282,610 B1 | 8/2001 | Bergsten |
| 6,289,012 B1 | 9/2001 | Harrington et al. |
| 6,289,345 B1 | 9/2001 | Yasue |
| 6,292,832 B1 | 9/2001 | Shah et al. |
| 6,295,542 B1 | 9/2001 | Corbin |
| 6,298,380 B1 | 10/2001 | Coile et al. |
| 6,304,913 B1 | 10/2001 | Rune |
| 6,308,162 B1 | 10/2001 | Ouimet et al. |
| 6,324,581 B1 | 11/2001 | Xu et al. |
| 6,327,622 B1 | 12/2001 | Jindal et al. |
| 6,330,574 B1 | 12/2001 | Murashita |
| 6,338,082 B1 | 1/2002 | Schneider |
| 6,339,785 B1 | 1/2002 | Feigenbaum |
| 6,343,324 B1 | 1/2002 | Hubis et al. |
| 6,347,339 B1 | 2/2002 | Morris et al. |
| 6,349,343 B1 | 2/2002 | Foody et al. |
| 6,353,848 B1 | 3/2002 | Morris |
| 6,360,270 B1 | 3/2002 | Cherkasova et al. |
| 6,363,056 B1 | 3/2002 | Beigi et al. |
| 6,370,527 B1 | 4/2002 | Singhal |
| 6,370,543 B2 | 4/2002 | Hoffert et al. |
| 6,374,263 B1 | 4/2002 | Bunger et al. |
| 6,374,300 B2 | 4/2002 | Masters |

(56) References Cited

U.S. PATENT DOCUMENTS

| | | |
|---|---|---|
| 6,389,433 B1 | 5/2002 | Bolosky et al. |
| 6,389,462 B1 | 5/2002 | Cohen et al. |
| 6,393,581 B1 | 5/2002 | Friedman et al. |
| 6,396,833 B1 | 5/2002 | Zhang et al. |
| 6,397,246 B1 | 5/2002 | Wolfe |
| 6,412,004 B1 | 6/2002 | Chen et al. |
| 6,430,562 B1 | 8/2002 | Kardos et al. |
| 6,434,081 B1 | 8/2002 | Johnson et al. |
| 6,438,595 B1 | 8/2002 | Blumenau et al. |
| 6,446,108 B1 | 9/2002 | Rosenberg et al. |
| 6,466,580 B1 | 10/2002 | Leung |
| 6,469,983 B2 | 10/2002 | Narayana et al. |
| 6,477,544 B1 | 11/2002 | Bolosky et al. |
| 6,480,476 B1 | 11/2002 | Willars |
| 6,484,261 B1 | 11/2002 | Wiegel |
| 6,487,561 B1 | 11/2002 | Ofek et al. |
| 6,490,624 B1 | 12/2002 | Sampson et al. |
| 6,493,804 B1 | 12/2002 | Soltis et al. |
| 6,510,135 B1 | 1/2003 | Almulhem et al. |
| 6,510,458 B1 | 1/2003 | Berstis et al. |
| 6,513,061 B1 | 1/2003 | Ebata et al. |
| 6,514,085 B2 | 2/2003 | Slattery et al. |
| 6,516,350 B1 | 2/2003 | Lumelsky et al. |
| 6,516,351 B2 | 2/2003 | Borr |
| 6,519,643 B1 | 2/2003 | Foulkes et al. |
| 6,529,508 B1 | 3/2003 | Li et al. |
| 6,542,936 B1 | 4/2003 | Mayle et al. |
| 6,549,916 B1 | 4/2003 | Sedlar |
| 6,553,352 B2 | 4/2003 | Delurgio et al. |
| 6,556,997 B1 | 4/2003 | Levy |
| 6,556,998 B1 | 4/2003 | Mukherjee et al. |
| 6,560,230 B1 | 5/2003 | Li et al. |
| 6,578,069 B1 | 6/2003 | Hopmann et al. |
| 6,601,084 B1 | 7/2003 | Bhaskaran et al. |
| 6,601,101 B1 | 7/2003 | Lee et al. |
| 6,606,663 B1 | 8/2003 | Liao et al. |
| 6,612,490 B1 | 9/2003 | Herrendoerfer et al. |
| 6,615,267 B1 | 9/2003 | Whalen et al. |
| 6,631,422 B1 | 10/2003 | Althaus et al. |
| 6,636,503 B1 | 10/2003 | Shiran et al. |
| 6,636,894 B1 | 10/2003 | Short et al. |
| 6,650,640 B1 | 11/2003 | Muller et al. |
| 6,650,641 B1 | 11/2003 | Albert et al. |
| 6,654,346 B1 | 11/2003 | Mahalingaiah et al. |
| 6,654,701 B2 | 11/2003 | Hatley |
| 6,661,802 B1 | 12/2003 | Homberg et al. |
| 6,683,873 B1 | 1/2004 | Kwok et al. |
| 6,691,165 B1 | 2/2004 | Bruck et al. |
| 6,694,517 B1 | 2/2004 | James et al. |
| 6,700,871 B1 | 3/2004 | Harper et al. |
| 6,701,415 B1 | 3/2004 | Hendren, III |
| 6,708,187 B1 | 3/2004 | Shanumgam et al. |
| 6,708,220 B1 | 3/2004 | Olin |
| 6,718,359 B2 | 4/2004 | Zisapel et al. |
| 6,718,380 B1 | 4/2004 | Mohaban et al. |
| 6,721,794 B2 | 4/2004 | Taylor et al. |
| 6,728,704 B2 | 4/2004 | Mao et al. |
| 6,738,357 B1 | 5/2004 | Richter et al. |
| 6,738,790 B1 | 5/2004 | Klein et al. |
| 6,742,035 B1 | 5/2004 | Zayas et al. |
| 6,742,045 B1 | 5/2004 | Albert et al. |
| 6,744,776 B1 | 6/2004 | Kalkunte et al. |
| 6,748,420 B1 | 6/2004 | Quatrano et al. |
| 6,748,457 B2 | 6/2004 | Fallon et al. |
| 6,751,663 B1 | 6/2004 | Farrell et al. |
| 6,754,215 B1 | 6/2004 | Arikawa et al. |
| 6,754,228 B1 | 6/2004 | Ludwig |
| 6,754,699 B2 | 6/2004 | Swildens et al. |
| 6,754,706 B1 | 6/2004 | Dong et al. |
| 6,757,706 B1 | 6/2004 | Dong et al. |
| 6,760,337 B1 | 7/2004 | Snyder, II et al. |
| 6,760,775 B1 | 7/2004 | Anerousis et al. |
| 6,772,219 B1 | 8/2004 | Shobatake |
| 6,775,672 B2 | 8/2004 | Mahalingam et al. |
| 6,775,673 B2 | 8/2004 | Mahalingam et al. |
| 6,775,679 B2 | 8/2004 | Gupta |
| 6,779,039 B1 | 8/2004 | Bommareddy et al. |
| 6,781,986 B1 | 8/2004 | Sabaa et al. |
| 6,781,990 B1 | 8/2004 | Puri et al. |
| 6,782,450 B2 | 8/2004 | Arnott et al. |
| 6,795,860 B1 | 9/2004 | Shah |
| 6,798,777 B1 | 9/2004 | Ferguson et al. |
| 6,801,960 B1 | 10/2004 | Ericson et al. |
| 6,804,542 B1 | 10/2004 | Haartsen |
| 6,816,901 B1 | 11/2004 | Sitaraman et al. |
| 6,816,977 B2 | 11/2004 | Brakmo et al. |
| 6,820,133 B1 | 11/2004 | Grove et al. |
| 6,826,613 B1 | 11/2004 | Wang et al. |
| 6,826,698 B1 | 11/2004 | Minkin et al. |
| 6,829,238 B2 | 12/2004 | Tokuyo et al. |
| 6,839,761 B2 | 1/2005 | Kadyk et al. |
| 6,839,850 B1 | 1/2005 | Campbell et al. |
| 6,847,959 B1 | 1/2005 | Arrouye et al. |
| 6,847,970 B2 | 1/2005 | Keller et al. |
| 6,850,997 B1 | 2/2005 | Rooney et al. |
| 6,857,009 B1 | 2/2005 | Ferreria |
| 6,862,282 B1 | 3/2005 | Oden |
| 6,865,593 B1 | 3/2005 | Reshef et al. |
| 6,868,082 B1 | 3/2005 | Allen, Jr. et al. |
| 6,868,447 B1 | 3/2005 | Slaughter et al. |
| 6,871,221 B1 | 3/2005 | Styles |
| 6,871,245 B2 | 3/2005 | Bradley |
| 6,876,629 B2 | 4/2005 | Beshai et al. |
| 6,876,654 B1 | 4/2005 | Hegde |
| 6,880,017 B1 | 4/2005 | Marce et al. |
| 6,883,137 B1 | 4/2005 | Girardot et al. |
| 6,888,836 B1 | 5/2005 | Cherkasova |
| 6,889,249 B2 | 5/2005 | Miloushev et al. |
| 6,904,040 B2 | 6/2005 | Salapura et al. |
| 6,914,881 B1 | 7/2005 | Mansfield et al. |
| 6,922,688 B1 | 7/2005 | Frey, Jr. |
| 6,928,082 B2 | 8/2005 | Liu et al. |
| 6,928,518 B2 | 8/2005 | Talagala |
| 6,931,544 B1 | 8/2005 | Kienhofer |
| 6,934,706 B1 | 8/2005 | Mancuso et al. |
| 6,938,039 B1 | 8/2005 | Bober et al. |
| 6,938,059 B2 | 8/2005 | Tamer et al. |
| 6,947,985 B2 | 9/2005 | Hegli et al. |
| 6,950,434 B1 | 9/2005 | Viswanath et al. |
| 6,954,780 B2 | 10/2005 | Susai et al. |
| 6,957,272 B2 | 10/2005 | Tallegas et al. |
| 6,959,373 B2 | 10/2005 | Testardi |
| 6,959,394 B1 | 10/2005 | Brickell et al. |
| 6,961,815 B2 | 11/2005 | Kistler et al. |
| 6,970,475 B1 | 11/2005 | Fraser et al. |
| 6,970,924 B1 | 11/2005 | Chu et al. |
| 6,973,455 B1 | 12/2005 | Vahalia et al. |
| 6,973,490 B1 | 12/2005 | Robertson et al. |
| 6,973,549 B1 | 12/2005 | Testardi |
| 6,975,592 B1 | 12/2005 | Seddigh et al. |
| 6,985,936 B2 | 1/2006 | Agarwalla et al. |
| 6,985,956 B2 | 1/2006 | Luke et al. |
| 6,986,015 B2 | 1/2006 | Testardi |
| 6,986,040 B1 | 1/2006 | Kramer et al. |
| 6,987,763 B2 | 1/2006 | Rochberger et al. |
| 6,990,074 B2 | 1/2006 | Wan et al. |
| 6,990,114 B1 | 1/2006 | Erimli et al. |
| 6,990,547 B2 | 1/2006 | Ulrich et al. |
| 6,990,667 B2 | 1/2006 | Ulrich et al. |
| 6,996,841 B2 | 2/2006 | Kadyk et al. |
| 6,996,845 B1 | 2/2006 | Hurst |
| 6,999,912 B2 | 2/2006 | Loisey et al. |
| 7,003,533 B2 | 2/2006 | Noguchi et al. |
| 7,003,564 B2 | 2/2006 | Greuel et al. |
| 7,006,502 B2 | 2/2006 | Lin |
| 7,006,981 B2 | 2/2006 | Rose et al. |
| 7,007,092 B2 | 2/2006 | Peiffer |
| 7,010,553 B2 | 3/2006 | Chen et al. |
| 7,010,615 B1 | 3/2006 | Tezuka et al. |
| 7,013,379 B1 | 3/2006 | Testardi |
| 7,020,644 B2 | 3/2006 | Jameson |
| 7,020,669 B2 | 3/2006 | McCann et al. |
| 7,020,713 B1 | 3/2006 | Shah et al. |
| 7,023,974 B1 | 4/2006 | Brannam et al. |
| 7,024,427 B2 | 4/2006 | Bobbitt et al. |

(56) References Cited

U.S. PATENT DOCUMENTS

| | | |
|---|---|---|
| 7,028,182 B1 | 4/2006 | Killcommons |
| 7,035,212 B1 | 4/2006 | Mittal et al. |
| 7,039,061 B2 | 5/2006 | Connor et al. |
| 7,051,112 B2 | 5/2006 | Dawson |
| 7,054,998 B2 | 5/2006 | Arnott et al. |
| 7,055,010 B2 | 5/2006 | Lin et al. |
| 7,058,633 B1 | 6/2006 | Gnagy et al. |
| 7,065,482 B2 | 6/2006 | Shorey et al. |
| 7,065,630 B1 | 6/2006 | Ledebohm et al. |
| 7,072,917 B2 | 7/2006 | Wong et al. |
| 7,075,924 B2 | 7/2006 | Richter et al. |
| 7,076,689 B2 | 7/2006 | Atkinson |
| 7,080,314 B1 | 7/2006 | Garofalakis et al. |
| 7,089,286 B1 | 8/2006 | Malik |
| 7,089,491 B2 | 8/2006 | Feinberg et al. |
| 7,107,348 B2 | 9/2006 | Shimada et al. |
| 7,111,115 B2 | 9/2006 | Peters et al. |
| 7,113,962 B1 | 9/2006 | Kee et al. |
| 7,113,993 B1 | 9/2006 | Cappiello et al. |
| 7,113,996 B2 | 9/2006 | Kronenberg |
| 7,120,728 B2 | 10/2006 | Krakirian et al. |
| 7,120,746 B2 | 10/2006 | Campbell et al. |
| 7,127,556 B2 | 10/2006 | Blumenau et al. |
| 7,133,863 B2 | 11/2006 | Teng et al. |
| 7,133,944 B2 | 11/2006 | Song et al. |
| 7,133,967 B2 | 11/2006 | Fujie et al. |
| 7,139,792 B1 | 11/2006 | Mishra et al. |
| 7,142,540 B2 | 11/2006 | Hendel et al. |
| 7,143,146 B2 | 11/2006 | Nakatani et al. |
| 7,146,524 B2 | 12/2006 | Patel et al. |
| 7,152,184 B2 | 12/2006 | Maeda et al. |
| 7,155,466 B2 | 12/2006 | Rodriguez et al. |
| 7,161,904 B2 | 1/2007 | Hussain et al. |
| 7,165,095 B2 | 1/2007 | Sim |
| 7,167,821 B2 | 1/2007 | Hardwick et al. |
| 7,171,469 B2 | 1/2007 | Ackaouy et al. |
| 7,173,929 B1 | 2/2007 | Testardi |
| 7,181,523 B2 | 2/2007 | Sim |
| 7,185,359 B2 | 2/2007 | Schmidt et al. |
| 7,191,163 B2 | 3/2007 | Herrera et al. |
| 7,194,579 B2 | 3/2007 | Robinson et al. |
| 7,200,658 B2 | 4/2007 | Goeller et al. |
| 7,228,359 B1 | 6/2007 | Monteiro |
| 7,228,422 B2 | 6/2007 | Morioka et al. |
| 7,231,571 B2 | 6/2007 | Buckely, Jr. |
| 7,234,074 B2 | 6/2007 | Cohn et al. |
| 7,236,491 B2 | 6/2007 | Tsao et al. |
| 7,240,100 B1 | 7/2007 | Wein et al. |
| 7,243,089 B2 | 7/2007 | Becker-Szendy et al. |
| 7,243,094 B2 | 7/2007 | Tabellion et al. |
| 7,249,197 B1 | 7/2007 | Roestenburg et al. |
| 7,257,633 B2 | 8/2007 | Masputra et al. |
| 7,263,610 B2 | 8/2007 | Parker et al. |
| 7,266,773 B2 | 9/2007 | Dorwart |
| 7,269,168 B2 | 9/2007 | Roy et al. |
| 7,269,582 B2 | 9/2007 | Winter et al. |
| 7,272,613 B2 | 9/2007 | Sim et al. |
| 7,280,536 B2 | 10/2007 | Testardi |
| 7,281,030 B1 | 10/2007 | Davis |
| 7,283,470 B1 | 10/2007 | Sindhu et al. |
| 7,284,150 B2 | 10/2007 | Ma et al. |
| 7,287,082 B1 | 10/2007 | O'Toole, Jr. |
| 7,292,541 B1 | 11/2007 | C S |
| 7,293,097 B2 | 11/2007 | Borr |
| 7,293,099 B2 | 11/2007 | Kalajan |
| 7,293,133 B1 | 11/2007 | Colgrove et al. |
| 7,295,827 B2 | 11/2007 | Liu et al. |
| 7,296,263 B1 | 11/2007 | Jacob |
| 7,299,250 B2 | 11/2007 | Douceur et al. |
| 7,299,491 B2 | 11/2007 | Shelest et al. |
| 7,308,475 B1 | 12/2007 | Pruitt et al. |
| 7,308,703 B2 | 12/2007 | Wright et al. |
| 7,308,709 B1 | 12/2007 | Brezak et al. |
| 7,310,339 B1 | 12/2007 | Powers et al. |
| 7,319,696 B2 | 1/2008 | Inoue et al. |
| 7,321,926 B1 | 1/2008 | Zhang et al. |
| 7,324,525 B2 | 1/2008 | Fuhs et al. |
| 7,324,533 B1 | 1/2008 | DeLiberato et al. |
| 7,330,486 B2 | 2/2008 | Ko et al. |
| 7,333,999 B1 | 2/2008 | Njemanze |
| 7,340,571 B2 | 3/2008 | Saze |
| 7,343,398 B1 | 3/2008 | Lownsbrough |
| 7,343,413 B2 | 3/2008 | Glide et al. |
| 7,346,664 B2 | 3/2008 | Wong et al. |
| 7,349,391 B2 | 3/2008 | Ben-Dor et al. |
| 7,349,827 B1 | 3/2008 | Heller |
| 7,355,977 B1 | 4/2008 | Li |
| 7,373,438 B1 | 5/2008 | DeBergalis et al. |
| 7,376,772 B2 | 5/2008 | Fallon |
| 7,383,288 B2 | 6/2008 | Miloushev et al. |
| 7,383,570 B2 | 6/2008 | Pinkas et al. |
| 7,398,552 B2 | 7/2008 | Pardee et al. |
| 7,401,220 B2 | 7/2008 | Bolosky et al. |
| 7,403,542 B1 | 7/2008 | Thompson |
| 7,406,484 B1 | 7/2008 | Srinivasan et al. |
| 7,409,440 B1 | 8/2008 | Jacob |
| 7,415,488 B1 | 8/2008 | Muth et al. |
| 7,415,608 B2 | 8/2008 | Bolosky et al. |
| 7,418,439 B2 | 8/2008 | Wong |
| 7,420,931 B2 | 9/2008 | Nanda et al. |
| 7,433,962 B2 | 10/2008 | Janssen et al. |
| 7,437,358 B2 | 10/2008 | Arrouye et al. |
| 7,437,478 B2 | 10/2008 | Yokota et al. |
| 7,440,982 B2 | 10/2008 | Lu et al. |
| 7,441,429 B1 | 10/2008 | Nucci et al. |
| 7,454,480 B2 | 11/2008 | Labio et al. |
| 7,457,982 B2 | 11/2008 | Rajan |
| 7,467,158 B2 | 12/2008 | Marinescu |
| 7,475,241 B2 | 1/2009 | Patel et al. |
| 7,477,796 B2 | 1/2009 | Sasaki et al. |
| 7,478,186 B1 | 1/2009 | Onufryk et al. |
| 7,490,162 B1 | 2/2009 | Masters |
| 7,496,695 B2 | 2/2009 | Go et al. |
| 7,500,028 B2 | 3/2009 | Yamagishi |
| 7,500,243 B2 | 3/2009 | Huetsch et al. |
| 7,500,269 B2 | 3/2009 | Huotari et al. |
| 7,505,795 B1 | 3/2009 | Lim et al. |
| 7,509,322 B2 | 3/2009 | Miloushev et al. |
| 7,512,673 B2 | 3/2009 | Miloushev et al. |
| 7,512,721 B1 | 3/2009 | Olson |
| 7,516,492 B1 | 4/2009 | Nisbet et al. |
| 7,519,813 B1 | 4/2009 | Cox et al. |
| 7,522,581 B2 | 4/2009 | Acharya et al. |
| 7,526,541 B2 | 4/2009 | Roese et al. |
| 7,533,197 B2 | 5/2009 | Leonard et al. |
| 7,542,848 B2 | 6/2009 | Ho |
| 7,555,608 B2 | 6/2009 | Naik et al. |
| 7,558,197 B1 | 7/2009 | Sindhu et al. |
| 7,558,910 B2 | 7/2009 | Alverson et al. |
| 7,562,110 B2 | 7/2009 | Miloushev et al. |
| 7,571,168 B2 | 8/2009 | Bahar et al. |
| 7,571,299 B2 | 8/2009 | Loeb |
| 7,574,433 B2 | 8/2009 | Engel |
| 7,577,723 B2 | 8/2009 | Matsuda et al. |
| 7,580,971 B1 | 8/2009 | Gollapudi et al. |
| 7,587,471 B2 | 9/2009 | Yasuda et al. |
| 7,590,732 B2 | 9/2009 | Rune |
| 7,590,747 B2 | 9/2009 | Coates et al. |
| 7,599,920 B1 | 10/2009 | Fox |
| 7,599,941 B2 | 10/2009 | Bahar et al. |
| 7,610,307 B2 | 10/2009 | Havewala et al. |
| 7,610,390 B2 | 10/2009 | Yared et al. |
| 7,617,121 B1 | 11/2009 | DeMayo et al. |
| 7,620,733 B1 | 11/2009 | Tzakikario et al. |
| 7,624,109 B2 | 11/2009 | Testardi |
| 7,624,424 B2 | 11/2009 | Morita et al. |
| 7,639,883 B2 | 12/2009 | Gill |
| 7,640,347 B1 | 12/2009 | Sloat et al. |
| 7,644,109 B2 | 1/2010 | Manley et al. |
| 7,644,137 B2 | 1/2010 | Bozak et al. |
| 7,647,416 B2 | 1/2010 | Chiang et al. |
| 7,653,699 B1 | 1/2010 | Colgrove et al. |
| 7,657,659 B1 | 2/2010 | Lambeth et al. |
| 7,668,166 B1 | 2/2010 | Rekhter et al. |

(56) References Cited

U.S. PATENT DOCUMENTS

| | | |
|---|---|---|
| 7,668,727 B2 | 2/2010 | Mitchell et al. |
| 7,668,851 B2 | 2/2010 | Triplett |
| 7,684,423 B2 | 3/2010 | Tripathi et al. |
| 7,689,596 B2 | 3/2010 | Tsunoda |
| 7,689,710 B2 | 3/2010 | Tang et al. |
| 7,694,082 B2 | 4/2010 | Golding et al. |
| 7,698,458 B1 | 4/2010 | Liu et al. |
| 7,706,261 B2 | 4/2010 | Sun et al. |
| 7,711,771 B2 | 5/2010 | Kirnos |
| 7,724,657 B2 | 5/2010 | Rao et al. |
| 7,725,093 B2 | 5/2010 | Sengupta et al. |
| 7,729,239 B1 | 6/2010 | Aronov et al. |
| 7,734,603 B1 | 6/2010 | McManis |
| 7,735,099 B1 | 6/2010 | Micalizzi, Jr. |
| 7,739,540 B2 | 6/2010 | Akutsu et al. |
| 7,742,412 B1 | 6/2010 | Medina |
| 7,743,035 B2 | 6/2010 | Chen et al. |
| 7,752,294 B2 | 7/2010 | Meyer et al. |
| 7,769,711 B2 | 8/2010 | Srinivasan et al. |
| 7,774,484 B1 * | 8/2010 | Masters ............... H04L 47/125 |
| | | 709/229 |
| 7,778,187 B2 | 8/2010 | Chaturvedi et al. |
| 7,783,514 B2 | 8/2010 | Hogan |
| 7,784,093 B2 | 8/2010 | Deng et al. |
| 7,788,335 B2 | 8/2010 | Miloushev et al. |
| 7,797,448 B1 | 9/2010 | Szoke |
| 7,801,978 B1 | 9/2010 | Susai et al. |
| 7,808,913 B2 | 10/2010 | Ansari et al. |
| 7,822,839 B1 | 10/2010 | Pruitt et al. |
| 7,822,939 B1 | 10/2010 | Veprinsky et al. |
| 7,826,487 B1 | 11/2010 | Mukerji et al. |
| 7,831,639 B1 | 11/2010 | Panchbudhe et al. |
| 7,831,662 B2 | 11/2010 | Clark et al. |
| 7,849,112 B2 | 12/2010 | Mane et al. |
| 7,861,085 B1 | 12/2010 | Case et al. |
| 7,870,154 B2 | 1/2011 | Shitomi et al. |
| 7,876,677 B2 | 1/2011 | Cheshire |
| 7,877,511 B1 | 1/2011 | Berger et al. |
| 7,877,524 B1 | 1/2011 | Annem et al. |
| 7,885,970 B2 | 2/2011 | Lacapra |
| 7,886,218 B2 | 2/2011 | Watson |
| 7,895,653 B2 | 2/2011 | Cab et al. |
| 7,899,899 B2 | 3/2011 | Joshi |
| 7,900,002 B2 | 3/2011 | Lyon |
| 7,903,554 B1 | 3/2011 | Manur et al. |
| 7,908,245 B2 | 3/2011 | Nakano et al. |
| 7,908,314 B2 | 3/2011 | Yamaguchi et al. |
| 7,913,053 B1 | 3/2011 | Newland |
| 7,916,728 B1 | 3/2011 | Mimms |
| 7,921,211 B2 | 4/2011 | Larson et al. |
| 7,925,908 B2 | 4/2011 | Kim |
| 7,930,365 B2 | 4/2011 | Dixit et al. |
| 7,930,400 B1 | 4/2011 | Fox |
| 7,933,946 B2 | 4/2011 | Livshits et al. |
| 7,941,517 B2 | 5/2011 | Migault et al. |
| 7,945,908 B1 | 5/2011 | Waldspurger et al. |
| 7,953,701 B2 | 5/2011 | Okitsu et al. |
| 7,958,222 B1 | 6/2011 | Pruitt et al. |
| 7,958,347 B1 | 6/2011 | Ferguson |
| 7,984,141 B2 | 7/2011 | Gupta et al. |
| 7,984,500 B1 | 7/2011 | Khanna et al. |
| 8,005,953 B2 | 8/2011 | Miloushev et al. |
| 8,006,016 B2 | 8/2011 | Muller et al. |
| 8,015,157 B2 | 9/2011 | Kamei et al. |
| 8,024,443 B1 | 9/2011 | Jacob |
| 8,037,528 B2 | 10/2011 | Williams et al. |
| 8,046,195 B2 | 10/2011 | Vecera et al. |
| 8,055,724 B2 | 11/2011 | Amegadzie et al. |
| 8,064,342 B2 | 11/2011 | Badger |
| 8,069,225 B2 | 11/2011 | McCanne et al. |
| 8,099,758 B2 | 1/2012 | Schaefer et al. |
| 8,103,781 B1 | 1/2012 | Wu et al. |
| 8,103,809 B1 | 1/2012 | Michels et al. |
| 8,112,491 B1 | 2/2012 | Michels et al. |
| 8,117,244 B2 | 2/2012 | Marinov et al. |
| 8,130,650 B2 | 3/2012 | Allen, Jr. et al. |
| 8,149,819 B2 | 4/2012 | Kobayashi et al. |
| 8,155,128 B2 | 4/2012 | Balyan et al. |
| 8,171,124 B2 | 5/2012 | Kondamuru |
| 8,189,567 B2 | 5/2012 | Kavanagh et al. |
| 8,190,769 B1 | 5/2012 | Shukla et al. |
| 8,199,757 B2 | 6/2012 | Pani et al. |
| 8,205,246 B2 | 6/2012 | Shatzkamer et al. |
| 8,209,260 B2 | 6/2012 | Kim et al. |
| 8,239,952 B1 | 8/2012 | Oliphant |
| 8,239,954 B2 | 8/2012 | Wobber et al. |
| 8,266,427 B2 | 9/2012 | Thubert et al. |
| 8,271,620 B2 | 9/2012 | Witchey |
| 8,274,895 B2 | 9/2012 | Rahman et al. |
| 8,281,383 B2 | 10/2012 | Levy-Abegnoli et al. |
| 8,289,968 B1 | 10/2012 | Zhuang |
| 8,290,928 B1 | 10/2012 | Pillai |
| 8,307,436 B2 | 11/2012 | Born |
| 8,321,908 B2 | 11/2012 | Gai et al. |
| 8,347,100 B1 | 1/2013 | Thornewell et al. |
| 8,351,333 B2 | 1/2013 | Rao et al. |
| 8,380,854 B2 | 2/2013 | Szabo |
| 8,396,836 B1 | 3/2013 | Ferguson et al. |
| 8,417,817 B1 | 4/2013 | Jacobs |
| 8,447,871 B1 | 5/2013 | Szabo |
| 8,447,970 B2 | 5/2013 | Klein et al. |
| 8,452,876 B1 | 5/2013 | Williams et al. |
| 8,463,850 B1 | 6/2013 | McCann |
| 8,464,265 B2 | 6/2013 | Worley |
| 8,468,247 B1 | 6/2013 | Richardson |
| 8,468,267 B2 | 6/2013 | Yigang |
| 8,521,851 B1 | 8/2013 | Richardson |
| 8,521,880 B1 | 8/2013 | Richardson |
| 8,539,224 B2 | 9/2013 | Henderson et al. |
| 8,560,693 B1 | 10/2013 | Wang et al. |
| 8,566,444 B1 | 10/2013 | Yona |
| 8,566,474 B2 | 10/2013 | Kanode et al. |
| 8,578,050 B2 | 11/2013 | Craig et al. |
| 8,601,000 B1 | 12/2013 | Stefani et al. |
| 8,606,921 B2 | 12/2013 | Vasquez et al. |
| 8,615,022 B2 | 12/2013 | Harrison et al. |
| 8,646,067 B2 | 2/2014 | Agarwal et al. |
| 8,665,868 B2 | 3/2014 | Kay |
| 8,701,179 B1 | 4/2014 | Penno et al. |
| 8,725,836 B2 | 5/2014 | Lowery et al. |
| 8,726,338 B2 | 5/2014 | Narayanaswamy et al. |
| 8,737,304 B2 | 5/2014 | Karuturi et al. |
| 8,778,665 B2 | 7/2014 | Gilde et al. |
| 8,804,504 B1 | 8/2014 | Chen |
| 8,819,109 B1 | 8/2014 | Krishnamurthy et al. |
| 8,819,419 B2 | 8/2014 | Carlson et al. |
| 8,819,768 B1 | 8/2014 | Koeten et al. |
| 8,830,874 B2 | 9/2014 | Cho et al. |
| 8,832,790 B1 | 9/2014 | Villa et al. |
| 8,838,817 B1 | 9/2014 | Biswas |
| 8,843,627 B1 * | 9/2014 | Baldi .................. H04L 43/026 |
| | | 709/224 |
| 8,844,036 B2 | 9/2014 | Saidi |
| 8,856,640 B1 | 10/2014 | Barr |
| 8,856,898 B1 | 10/2014 | Thornewell et al. |
| 8,873,753 B2 | 10/2014 | Parker |
| 8,875,274 B2 | 10/2014 | Montemurro et al. |
| 8,879,431 B2 | 11/2014 | Ridel et al. |
| 8,886,981 B1 | 11/2014 | Baumann et al. |
| 8,893,233 B2 | 11/2014 | Lee |
| 8,908,545 B1 | 12/2014 | Chen et al. |
| 8,910,292 B1 | 12/2014 | Oliphant et al. |
| 8,954,080 B2 | 2/2015 | Janakiriman et al. |
| 8,959,215 B2 | 2/2015 | Koponen et al. |
| 8,972,968 B1 * | 3/2015 | Vichare ................ G06F 8/65 |
| | | 717/170 |
| 9,036,529 B2 | 5/2015 | Erickson et al. |
| 9,037,166 B2 | 5/2015 | De wit et al. |
| 9,038,184 B1 | 5/2015 | Mann |
| 9,047,259 B1 | 6/2015 | Ho |
| 9,077,554 B1 | 7/2015 | Szabo |
| 9,083,760 B1 | 7/2015 | Hughes et al. |
| 9,106,699 B2 | 8/2015 | Thornewell et al. |
| 9,143,451 B2 | 9/2015 | Amdahl et al. |

(56) References Cited

U.S. PATENT DOCUMENTS

| | | |
|---|---|---|
| 9,178,934 B1 | 11/2015 | Kolam |
| 9,244,843 B1 | 1/2016 | Michels et al. |
| 9,258,742 B1 | 2/2016 | Piangiani et al. |
| 9,444,620 B1 | 9/2016 | Murphy |
| 9,497,614 B1 | 11/2016 | Ridel et al. |
| 9,509,764 B1 | 11/2016 | Kolam |
| 9,560,160 B1 | 1/2017 | Kolam et al. |
| 9,832,069 B1 * | 11/2017 | Cleveland ......... H04L 29/08162 |
| 10,334,016 B2 | 6/2019 | Wei |
| 2001/0002472 A1 | 5/2001 | Kanai |
| 2001/0007560 A1 | 7/2001 | Masuda et al. |
| 2001/0009554 A1 | 7/2001 | Katseff et al. |
| 2001/0023442 A1 | 9/2001 | Masters |
| 2001/0047293 A1 | 11/2001 | Waller et al. |
| 2001/0051955 A1 | 12/2001 | Wong |
| 2002/0010757 A1 | 1/2002 | Granik et al. |
| 2002/0010783 A1 | 1/2002 | Primak et al. |
| 2002/0012352 A1 | 1/2002 | Hansson et al. |
| 2002/0032777 A1 | 3/2002 | Kawata et al. |
| 2002/0035537 A1 | 3/2002 | Waller et al. |
| 2002/0038360 A1 | 3/2002 | Andrews et al. |
| 2002/0046291 A1 | 4/2002 | O'callaghan et al. |
| 2002/0049842 A1 | 4/2002 | Huetsch et al. |
| 2002/0052928 A1 | 5/2002 | Stern et al. |
| 2002/0059263 A1 | 5/2002 | Shima et al. |
| 2002/0059428 A1 | 5/2002 | Susai et al. |
| 2002/0065848 A1 | 5/2002 | Walker et al. |
| 2002/0072048 A1 | 6/2002 | Slattery et al. |
| 2002/0083067 A1 | 6/2002 | Tamayo et al. |
| 2002/0083124 A1 | 6/2002 | Knox et al. |
| 2002/0087571 A1 | 7/2002 | Stapel et al. |
| 2002/0087744 A1 | 7/2002 | Kitchin |
| 2002/0087887 A1 | 7/2002 | Busam et al. |
| 2002/0095498 A1 | 7/2002 | Chanda et al. |
| 2002/0099829 A1 | 7/2002 | Richards et al. |
| 2002/0099842 A1 | 7/2002 | Jennings et al. |
| 2002/0103823 A1 | 8/2002 | Jackson et al. |
| 2002/0103916 A1 | 8/2002 | Chen et al. |
| 2002/0112061 A1 | 8/2002 | Shih et al. |
| 2002/0138615 A1 | 9/2002 | Schmeling |
| 2002/0143819 A1 | 10/2002 | Han et al. |
| 2002/0143852 A1 | 10/2002 | Guo et al. |
| 2002/0143909 A1 | 10/2002 | Botz et al. |
| 2002/0143955 A1 | 10/2002 | Shimada et al. |
| 2002/0150253 A1 | 10/2002 | Brezak et al. |
| 2002/0156905 A1 | 10/2002 | Weissman |
| 2002/0161911 A1 | 10/2002 | Pinckney, III et al. |
| 2002/0161913 A1 | 10/2002 | Gonzalez et al. |
| 2002/0162118 A1 | 10/2002 | Levy et al. |
| 2002/0174048 A1 | 11/2002 | Dheer |
| 2002/0174216 A1 | 11/2002 | Shorey et al. |
| 2002/0188753 A1 | 12/2002 | Tang et al. |
| 2002/0194112 A1 | 12/2002 | DePinto et al. |
| 2002/0194342 A1 | 12/2002 | Lu et al. |
| 2002/0198956 A1 | 12/2002 | Dunshea et al. |
| 2002/0198993 A1 | 12/2002 | Cudd et al. |
| 2003/0005172 A1 | 1/2003 | Chessell |
| 2003/0009528 A1 | 1/2003 | Sharif et al. |
| 2003/0012382 A1 | 1/2003 | Ferchichi et al. |
| 2003/0018450 A1 | 1/2003 | Carley |
| 2003/0018585 A1 | 1/2003 | Butler et al. |
| 2003/0028514 A1 | 2/2003 | Lord et al. |
| 2003/0033308 A1 | 2/2003 | Patel et al. |
| 2003/0033445 A1 | 2/2003 | Simpson |
| 2003/0033535 A1 | 2/2003 | Fisher et al. |
| 2003/0034905 A1 | 2/2003 | Anton et al. |
| 2003/0037070 A1 | 2/2003 | Marston |
| 2003/0046291 A1 | 3/2003 | Fascenda |
| 2003/0051045 A1 | 3/2003 | Connor |
| 2003/0055723 A1 | 3/2003 | English |
| 2003/0065653 A1 | 4/2003 | Overton et al. |
| 2003/0065951 A1 | 4/2003 | Igeta et al. |
| 2003/0065956 A1 | 4/2003 | Belapurkar et al. |
| 2003/0067930 A1 | 4/2003 | Salapura et al. |
| 2003/0069918 A1 | 4/2003 | Lu et al. |
| 2003/0069974 A1 | 4/2003 | Lu et al. |
| 2003/0070069 A1 | 4/2003 | Belapurkar et al. |
| 2003/0074301 A1 | 4/2003 | Solomon |
| 2003/0074400 A1 | 4/2003 | Brooks |
| 2003/0074434 A1 | 4/2003 | Jason et al. |
| 2003/0086415 A1 | 5/2003 | Bernhard et al. |
| 2003/0105807 A1 | 6/2003 | Thompson et al. |
| 2003/0105846 A1 | 6/2003 | Zhao et al. |
| 2003/0105983 A1 | 6/2003 | Brakmo et al. |
| 2003/0108000 A1 | 6/2003 | Chaney et al. |
| 2003/0108002 A1 | 6/2003 | Chaney et al. |
| 2003/0108052 A1 | 6/2003 | Inoue et al. |
| 2003/0120948 A1 | 6/2003 | Schmidt et al. |
| 2003/0128708 A1 | 7/2003 | Inoue et al. |
| 2003/0130945 A1 | 7/2003 | Force et al. |
| 2003/0135629 A1 | 7/2003 | Sasaki et al. |
| 2003/0139934 A1 | 7/2003 | Mandera |
| 2003/0145062 A1 | 7/2003 | Sharma et al. |
| 2003/0145233 A1 | 7/2003 | Poletto et al. |
| 2003/0156586 A1 | 8/2003 | Lee et al. |
| 2003/0159072 A1 | 8/2003 | Bellinger et al. |
| 2003/0163576 A1 | 8/2003 | Janssen et al. |
| 2003/0171978 A1 | 9/2003 | Jenkins et al. |
| 2003/0172155 A1 | 9/2003 | Kim |
| 2003/0177175 A1 | 9/2003 | Worley et al. |
| 2003/0177364 A1 | 9/2003 | Walsh et al. |
| 2003/0177388 A1 | 9/2003 | Botz et al. |
| 2003/0179755 A1 | 9/2003 | Fraser |
| 2003/0189936 A1 | 10/2003 | Terrell et al. |
| 2003/0191812 A1 | 10/2003 | Agarwalla et al. |
| 2003/0195813 A1 | 10/2003 | Pallister et al. |
| 2003/0195962 A1 | 10/2003 | Kikuchi et al. |
| 2003/0204636 A1 | 10/2003 | Greenblat et al. |
| 2003/0208596 A1 | 11/2003 | Carolan et al. |
| 2003/0212954 A1 | 11/2003 | Patrudu |
| 2003/0220835 A1 | 11/2003 | Barnes, Jr. |
| 2003/0221000 A1 | 11/2003 | Cherkasova et al. |
| 2003/0225485 A1 | 12/2003 | Fritz et al. |
| 2003/0229665 A1 | 12/2003 | Ryman |
| 2003/0233385 A1 | 12/2003 | Srinivasa et al. |
| 2003/0236995 A1 | 12/2003 | Fretwell, Jr. |
| 2004/0003266 A1 | 1/2004 | Moshir et al. |
| 2004/0003287 A1 | 1/2004 | Zissimopoulos et al. |
| 2004/0006575 A1 | 1/2004 | Visharam et al. |
| 2004/0006591 A1 | 1/2004 | Matsui et al. |
| 2004/0010654 A1 | 1/2004 | Yasuda et al. |
| 2004/0015783 A1 | 1/2004 | Lennon et al. |
| 2004/0017825 A1 | 1/2004 | Stanwood et al. |
| 2004/0028043 A1 | 2/2004 | Maveli et al. |
| 2004/0030627 A1 | 2/2004 | Sedukhin |
| 2004/0030740 A1 | 2/2004 | Stelting |
| 2004/0043758 A1 | 3/2004 | Sorvari et al. |
| 2004/0054812 A1 | 3/2004 | Liang et al. |
| 2004/0059789 A1 | 3/2004 | Shum |
| 2004/0064544 A1 | 4/2004 | Barsness et al. |
| 2004/0064554 A1 | 4/2004 | Kuno et al. |
| 2004/0072569 A1 | 4/2004 | Omae et al. |
| 2004/0093361 A1 | 5/2004 | Therrien et al. |
| 2004/0098595 A1 | 5/2004 | Aupperle et al. |
| 2004/0103283 A1 | 5/2004 | Hornak |
| 2004/0104944 A1 | 6/2004 | Koay et al. |
| 2004/0111523 A1 | 6/2004 | Hall et al. |
| 2004/0111621 A1 | 6/2004 | Himberger et al. |
| 2004/0111669 A1 | 6/2004 | Rossmann |
| 2004/0117493 A1 | 6/2004 | Bazot et al. |
| 2004/0122926 A1 | 6/2004 | Moore et al. |
| 2004/0123157 A1 | 6/2004 | Alagna |
| 2004/0123277 A1 | 6/2004 | Schrader et al. |
| 2004/0133605 A1 | 7/2004 | Chang et al. |
| 2004/0133606 A1 | 7/2004 | Miloushev et al. |
| 2004/0136379 A1 | 7/2004 | Liao et al. |
| 2004/0138858 A1 | 7/2004 | Carley |
| 2004/0139355 A1 | 7/2004 | Axel et al. |
| 2004/0141516 A1 | 7/2004 | Lee |
| 2004/0151186 A1 | 8/2004 | Akama |
| 2004/0153479 A1 | 8/2004 | Mikesell et al. |
| 2004/0153545 A1 * | 8/2004 | Pandya ............... H04L 69/162 709/226 |
| 2004/0153972 A1 | 8/2004 | Jaepel |

(56) References Cited

U.S. PATENT DOCUMENTS

| | | |
|---|---|---|
| 2004/0165588 A1 | 8/2004 | Pandya |
| 2004/0167967 A1 | 8/2004 | Bastian et al. |
| 2004/0172484 A1 | 9/2004 | Hafsteinsson et al. |
| 2004/0177165 A1 | 9/2004 | Masputra et al. |
| 2004/0192312 A1 | 9/2004 | Li et al. |
| 2004/0199547 A1 | 10/2004 | Winter et al. |
| 2004/0199762 A1 | 10/2004 | Carlson et al. |
| 2004/0202161 A1 | 10/2004 | Stachura et al. |
| 2004/0210663 A1 | 10/2004 | Phillips et al. |
| 2004/0213156 A1 | 10/2004 | Smallwood et al. |
| 2004/0215665 A1 | 10/2004 | Edgar et al. |
| 2004/0225810 A1* | 11/2004 | Hiratsuka ............ G06F 13/385 710/305 |
| 2004/0236798 A1 | 11/2004 | Srinivasan et al. |
| 2004/0236826 A1 | 11/2004 | Harville et al. |
| 2004/0249948 A1 | 12/2004 | Sethi et al. |
| 2004/0255000 A1 | 12/2004 | Simionescu et al. |
| 2004/0264472 A1 | 12/2004 | Oliver et al. |
| 2004/0264481 A1 | 12/2004 | Darling et al. |
| 2004/0267897 A1 | 12/2004 | Hill et al. |
| 2004/0267920 A1 | 12/2004 | Hydrie et al. |
| 2004/0267948 A1 | 12/2004 | Oliver et al. |
| 2004/0268221 A1 | 12/2004 | Wang |
| 2004/0268358 A1 | 12/2004 | Darling et al. |
| 2005/0004887 A1 | 1/2005 | Lgakura et al. |
| 2005/0007991 A1 | 1/2005 | Ton et al. |
| 2005/0008017 A1 | 1/2005 | Datta et al. |
| 2005/0021703 A1 | 1/2005 | Cherry et al. |
| 2005/0021736 A1 | 1/2005 | Carusi et al. |
| 2005/0022008 A1 | 1/2005 | Goodman et al. |
| 2005/0027841 A1 | 2/2005 | Rolfe |
| 2005/0027869 A1 | 2/2005 | Johnson |
| 2005/0028010 A1 | 2/2005 | Wallman |
| 2005/0044158 A1 | 2/2005 | Malik |
| 2005/0044213 A1 | 2/2005 | Kobayashi et al. |
| 2005/0052440 A1 | 3/2005 | Kim et al. |
| 2005/0055435 A1 | 3/2005 | Gbadegesin et al. |
| 2005/0071283 A1 | 3/2005 | Randle et al. |
| 2005/0078604 A1 | 4/2005 | Yim |
| 2005/0083952 A1 | 4/2005 | Swain |
| 2005/0091214 A1 | 4/2005 | Probert et al. |
| 2005/0108575 A1 | 5/2005 | Yung |
| 2005/0114559 A1 | 5/2005 | Miller |
| 2005/0114701 A1 | 5/2005 | Atkins et al. |
| 2005/0117589 A1 | 6/2005 | Douady et al. |
| 2005/0122977 A1 | 6/2005 | Lieberman |
| 2005/0125195 A1 | 6/2005 | Brendel |
| 2005/0154837 A1 | 7/2005 | Keohane et al. |
| 2005/0160161 A1 | 7/2005 | Barrett et al. |
| 2005/0165656 A1 | 7/2005 | Frederick et al. |
| 2005/0174944 A1 | 8/2005 | Legault et al. |
| 2005/0175013 A1 | 8/2005 | Le Pennec et al. |
| 2005/0175014 A1 | 8/2005 | Patrick |
| 2005/0187866 A1 | 8/2005 | Lee |
| 2005/0188220 A1 | 8/2005 | Nilsson et al. |
| 2005/0198234 A1 | 9/2005 | Leib et al. |
| 2005/0198310 A1 | 9/2005 | Kim et al. |
| 2005/0198501 A1 | 9/2005 | Andreev et al. |
| 2005/0213587 A1 | 9/2005 | Cho et al. |
| 2005/0229255 A1 | 10/2005 | Gula |
| 2005/0234928 A1 | 10/2005 | Shkvarchuk et al. |
| 2005/0240664 A1 | 10/2005 | Chen et al. |
| 2005/0256806 A1 | 11/2005 | Tien et al. |
| 2005/0262238 A1 | 11/2005 | Reeves et al. |
| 2005/0273456 A1 | 12/2005 | Revanuru et al. |
| 2005/0288939 A1 | 12/2005 | Peled et al. |
| 2005/0289111 A1 | 12/2005 | Tribble et al. |
| 2006/0007928 A1 | 1/2006 | Sangillo |
| 2006/0010502 A1 | 1/2006 | Mimatsu et al. |
| 2006/0026680 A1* | 2/2006 | Zakas ................... H04L 29/06 726/22 |
| 2006/0026681 A1* | 2/2006 | Zakas ................... H04L 29/06 726/22 |
| 2006/0026682 A1* | 2/2006 | Zakas ................... H04L 29/06 726/22 |
| 2006/0031374 A1 | 2/2006 | Lu et al. |
| 2006/0031520 A1 | 2/2006 | Bedekar et al. |
| 2006/0031778 A1 | 2/2006 | Goodwin et al. |
| 2006/0036764 A1 | 2/2006 | Yokota et al. |
| 2006/0045089 A1 | 3/2006 | Bacher et al. |
| 2006/0045096 A1 | 3/2006 | Farmer et al. |
| 2006/0047785 A1 | 3/2006 | Wang et al. |
| 2006/0059005 A1 | 3/2006 | Horn et al. |
| 2006/0059267 A1 | 3/2006 | Cugi et al. |
| 2006/0067582 A1 | 3/2006 | Bi et al. |
| 2006/0075475 A1 | 4/2006 | Boulos et al. |
| 2006/0077902 A1 | 4/2006 | Kannan et al. |
| 2006/0077986 A1 | 4/2006 | Rune |
| 2006/0080353 A1 | 4/2006 | Miloushev et al. |
| 2006/0083205 A1 | 4/2006 | Buddhikot et al. |
| 2006/0095573 A1 | 5/2006 | Carle et al. |
| 2006/0100752 A1 | 5/2006 | Kim et al. |
| 2006/0104303 A1 | 5/2006 | Makineni et al. |
| 2006/0106802 A1 | 5/2006 | Giblin et al. |
| 2006/0112176 A1 | 5/2006 | Liu et al. |
| 2006/0112272 A1 | 5/2006 | Morioka et al. |
| 2006/0112367 A1 | 5/2006 | Harris |
| 2006/0123062 A1 | 6/2006 | Bobbitt et al. |
| 2006/0123210 A1 | 6/2006 | Pritchett et al. |
| 2006/0129684 A1 | 6/2006 | Datta |
| 2006/0130133 A1 | 6/2006 | Andreev et al. |
| 2006/0133374 A1 | 6/2006 | Sekiguchi |
| 2006/0135198 A1 | 6/2006 | Lee |
| 2006/0140193 A1 | 6/2006 | Kakani et al. |
| 2006/0153201 A1 | 7/2006 | Hepper et al. |
| 2006/0156416 A1 | 7/2006 | Huotari et al. |
| 2006/0161577 A1 | 7/2006 | Kulkarni et al. |
| 2006/0161965 A1 | 7/2006 | Shelest |
| 2006/0167838 A1 | 7/2006 | Lacapra |
| 2006/0168070 A1 | 7/2006 | Thompson et al. |
| 2006/0171365 A1 | 8/2006 | Borella |
| 2006/0179153 A1 | 8/2006 | Lee et al. |
| 2006/0182103 A1 | 8/2006 | Martini et al. |
| 2006/0184589 A1 | 8/2006 | Lees et al. |
| 2006/0184647 A1 | 8/2006 | Dixit et al. |
| 2006/0195508 A1 | 8/2006 | Bernardin et al. |
| 2006/0195588 A1 | 8/2006 | Pennington |
| 2006/0200470 A1 | 9/2006 | Lacapra et al. |
| 2006/0209669 A1 | 9/2006 | Nishio |
| 2006/0209853 A1 | 9/2006 | Hidaka et al. |
| 2006/0221832 A1 | 10/2006 | Muller et al. |
| 2006/0221835 A1 | 10/2006 | Sweeney |
| 2006/0224687 A1 | 10/2006 | Popkin et al. |
| 2006/0229861 A1 | 10/2006 | Tatsuoka et al. |
| 2006/0230148 A1 | 10/2006 | Forecast et al. |
| 2006/0230265 A1 | 10/2006 | Krishna |
| 2006/0233106 A1 | 10/2006 | Achlioptas et al. |
| 2006/0235996 A1 | 10/2006 | Wolde et al. |
| 2006/0235998 A1 | 10/2006 | Stecher et al. |
| 2006/0242300 A1 | 10/2006 | Yumoto et al. |
| 2006/0259320 A1 | 11/2006 | LaSalle et al. |
| 2006/0268692 A1 | 11/2006 | Wright et al. |
| 2006/0268704 A1 | 11/2006 | Ansari et al. |
| 2006/0270341 A1 | 11/2006 | Kim et al. |
| 2006/0271598 A1 | 11/2006 | Wong et al. |
| 2006/0277225 A1 | 12/2006 | Mark et al. |
| 2006/0282442 A1 | 12/2006 | Lennon et al. |
| 2006/0282461 A1 | 12/2006 | Marinescu |
| 2006/0282471 A1 | 12/2006 | Mark et al. |
| 2006/0288128 A1 | 12/2006 | Moskalev et al. |
| 2006/0288413 A1 | 12/2006 | Kubota |
| 2006/0291483 A1 | 12/2006 | Bela |
| 2006/0294054 A1 | 12/2006 | Kudo et al. |
| 2007/0005807 A1 | 1/2007 | Wong |
| 2007/0006293 A1 | 1/2007 | Balakrishnan et al. |
| 2007/0016613 A1 | 1/2007 | Foresti et al. |
| 2007/0016662 A1 | 1/2007 | Desai et al. |
| 2007/0019636 A1 | 1/2007 | Lau et al. |
| 2007/0019658 A1 | 1/2007 | Park et al. |
| 2007/0024919 A1 | 2/2007 | Wong et al. |
| 2007/0027929 A1 | 2/2007 | Whelan |
| 2007/0027935 A1 | 2/2007 | Haselton et al. |
| 2007/0038994 A1 | 2/2007 | Davis et al. |
| 2007/0050338 A1 | 3/2007 | Strohm |

(56) References Cited

U.S. PATENT DOCUMENTS

| | | |
|---|---|---|
| 2007/0050843 A1 | 3/2007 | Manville et al. |
| 2007/0058670 A1 | 3/2007 | Konduru et al. |
| 2007/0064661 A1 | 3/2007 | Sood et al. |
| 2007/0067771 A1 | 3/2007 | Kulbak et al. |
| 2007/0074169 A1 | 3/2007 | Chess |
| 2007/0083646 A1 | 4/2007 | Miller et al. |
| 2007/0088702 A1 | 4/2007 | Fridella et al. |
| 2007/0088822 A1 | 4/2007 | Coile et al. |
| 2007/0088852 A1 | 4/2007 | Levkovitz |
| 2007/0094390 A1 | 4/2007 | Nussey |
| 2007/0106796 A1 | 5/2007 | Kudo et al. |
| 2007/0107048 A1 | 5/2007 | Halls et al. |
| 2007/0112775 A1 | 5/2007 | Ackerman |
| 2007/0118879 A1 | 5/2007 | Yeun |
| 2007/0124415 A1 | 5/2007 | Lev-Ran et al. |
| 2007/0124502 A1 | 5/2007 | Li |
| 2007/0130255 A1 | 6/2007 | Wolovitz et al. |
| 2007/0136308 A1 | 6/2007 | Tsirigotis et al. |
| 2007/0147246 A1 | 6/2007 | Hurley et al. |
| 2007/0162434 A1 | 7/2007 | Alessi |
| 2007/0162891 A1 | 7/2007 | Burner et al. |
| 2007/0168320 A1 | 7/2007 | Borthakur et al. |
| 2007/0168525 A1 | 7/2007 | DeLeon et al. |
| 2007/0174491 A1 | 7/2007 | Still et al. |
| 2007/0192543 A1 | 8/2007 | Naik et al. |
| 2007/0208748 A1 | 9/2007 | Li |
| 2007/0209075 A1 | 9/2007 | Coffman |
| 2007/0214240 A1 | 9/2007 | Kalliola et al. |
| 2007/0214503 A1 | 9/2007 | Shulman et al. |
| 2007/0220598 A1 | 9/2007 | Salowey et al. |
| 2007/0226775 A1* | 9/2007 | Andreasen ........... H04L 63/0227 726/1 |
| 2007/0233809 A1 | 10/2007 | Brownell et al. |
| 2007/0233826 A1 | 10/2007 | Tindal et al. |
| 2007/0250560 A1 | 10/2007 | Wein et al. |
| 2007/0258451 A1 | 11/2007 | Bouat |
| 2007/0260970 A1 | 11/2007 | Dorwart |
| 2007/0293210 A1* | 12/2007 | Strub ................... H04L 63/102 455/411 |
| 2007/0294410 A1* | 12/2007 | Pandya ............... H04L 12/2602 709/226 |
| 2007/0297410 A1 | 12/2007 | Yoon et al. |
| 2007/0297551 A1 | 12/2007 | Choi |
| 2008/0004022 A1 | 1/2008 | Johannesson et al. |
| 2008/0008202 A1 | 1/2008 | Terrell et al. |
| 2008/0010372 A1 | 1/2008 | Khedouri et al. |
| 2008/0022059 A1 | 1/2008 | Zimmerer et al. |
| 2008/0025297 A1 | 1/2008 | Kashyap |
| 2008/0031258 A1 | 2/2008 | Acharya et al. |
| 2008/0034136 A1 | 2/2008 | Ulenas |
| 2008/0046432 A1 | 2/2008 | Anderson et al. |
| 2008/0070575 A1 | 3/2008 | Claussen et al. |
| 2008/0072303 A1 | 3/2008 | Syed |
| 2008/0113656 A1* | 5/2008 | Lee ........................ H04L 67/62 455/414.3 |
| 2008/0120370 A1 | 5/2008 | Chan et al. |
| 2008/0120533 A1 | 5/2008 | Lazier et al. |
| 2008/0120592 A1 | 5/2008 | Tanguay et al. |
| 2008/0120626 A1 | 5/2008 | Graffagnino et al. |
| 2008/0126509 A1 | 5/2008 | Subramanian et al. |
| 2008/0130746 A1 | 6/2008 | Soroushian et al. |
| 2008/0133518 A1 | 6/2008 | Kapoor et al. |
| 2008/0134311 A1 | 6/2008 | Medvinsky et al. |
| 2008/0137659 A1 | 6/2008 | Levy-Abegnoli et al. |
| 2008/0141246 A1 | 6/2008 | Kuck et al. |
| 2008/0148340 A1 | 6/2008 | Powell et al. |
| 2008/0148408 A1 | 6/2008 | Kao |
| 2008/0155079 A1 | 6/2008 | Spiegelman |
| 2008/0159145 A1 | 7/2008 | Muthukrishnan et al. |
| 2008/0162141 A1 | 7/2008 | Lortz |
| 2008/0165801 A1 | 7/2008 | Sheppard |
| 2008/0178278 A1 | 7/2008 | Grinstein et al. |
| 2008/0184248 A1 | 7/2008 | Barua et al. |
| 2008/0195628 A1 | 8/2008 | Kim |
| 2008/0201599 A1 | 8/2008 | Ferraiolo et al. |
| 2008/0205415 A1 | 8/2008 | Morales |
| 2008/0205613 A1 | 8/2008 | Lopez |
| 2008/0208868 A1 | 8/2008 | Hubbard |
| 2008/0208917 A1 | 8/2008 | Smoot et al. |
| 2008/0209073 A1 | 8/2008 | Tang |
| 2008/0222223 A1 | 9/2008 | Srinivasan et al. |
| 2008/0222646 A1 | 9/2008 | Sigal et al. |
| 2008/0225710 A1 | 9/2008 | Raja et al. |
| 2008/0228911 A1 | 9/2008 | Mackey |
| 2008/0229415 A1 | 9/2008 | Kapoor et al. |
| 2008/0235508 A1 | 9/2008 | Ran |
| 2008/0239986 A1 | 10/2008 | Ku et al. |
| 2008/0243769 A1 | 10/2008 | Arbour et al. |
| 2008/0253395 A1 | 10/2008 | Pandya |
| 2008/0256224 A1 | 10/2008 | Kaji et al. |
| 2008/0263401 A1 | 10/2008 | Stenzel |
| 2008/0270578 A1 | 10/2008 | Zhang et al. |
| 2008/0271132 A1 | 10/2008 | Jokela et al. |
| 2008/0279200 A1 | 11/2008 | Shatzkamer et al. |
| 2008/0281908 A1 | 11/2008 | McCanne et al. |
| 2008/0281944 A1 | 11/2008 | Vorne et al. |
| 2008/0282047 A1 | 11/2008 | Arakawa et al. |
| 2008/0282354 A1 | 11/2008 | Wobber et al. |
| 2008/0288661 A1 | 11/2008 | Galles |
| 2008/0289013 A1 | 11/2008 | Morris et al. |
| 2008/0301760 A1 | 12/2008 | Lim |
| 2008/0304457 A1 | 12/2008 | Thubert et al. |
| 2008/0316922 A1 | 12/2008 | Riddle et al. |
| 2009/0003204 A1 | 1/2009 | Okholm et al. |
| 2009/0007162 A1 | 1/2009 | Sheehan |
| 2009/0016217 A1 | 1/2009 | Kashyap |
| 2009/0028337 A1 | 1/2009 | Balabine et al. |
| 2009/0030968 A1* | 1/2009 | Boudreau ............ H04L 67/125 709/201 |
| 2009/0037975 A1 | 2/2009 | Ishikawa et al. |
| 2009/0041230 A1 | 2/2009 | Williams |
| 2009/0049230 A1 | 2/2009 | Pandya |
| 2009/0055607 A1 | 2/2009 | Schack et al. |
| 2009/0064337 A1 | 3/2009 | Chien |
| 2009/0070617 A1 | 3/2009 | Arimilli et al. |
| 2009/0077097 A1 | 3/2009 | Lacapra et al. |
| 2009/0077619 A1 | 3/2009 | Boyce |
| 2009/0080440 A1 | 3/2009 | Balyan et al. |
| 2009/0089344 A1 | 4/2009 | Brown et al. |
| 2009/0089487 A1 | 4/2009 | Kwon et al. |
| 2009/0094252 A1 | 4/2009 | Wong et al. |
| 2009/0094311 A1 | 4/2009 | Awadallah et al. |
| 2009/0094610 A1 | 4/2009 | Sukirya |
| 2009/0097480 A1 | 4/2009 | Curtis et al. |
| 2009/0100518 A1 | 4/2009 | Overcash |
| 2009/0106255 A1 | 4/2009 | Lacapra et al. |
| 2009/0106263 A1 | 4/2009 | Khalid et al. |
| 2009/0106363 A1 | 4/2009 | Fallen |
| 2009/0106413 A1 | 4/2009 | Salo et al. |
| 2009/0119504 A1 | 5/2009 | Van os et al. |
| 2009/0119777 A1 | 5/2009 | Jeon |
| 2009/0125496 A1 | 5/2009 | Wexler et al. |
| 2009/0125511 A1 | 5/2009 | Kumar |
| 2009/0125532 A1 | 5/2009 | Wexler et al. |
| 2009/0125955 A1 | 5/2009 | DeLorme |
| 2009/0126525 A1 | 5/2009 | Shim et al. |
| 2009/0132616 A1 | 5/2009 | Winter et al. |
| 2009/0138314 A1 | 5/2009 | Bruce |
| 2009/0138749 A1 | 5/2009 | Moll et al. |
| 2009/0141891 A1 | 6/2009 | Boyen et al. |
| 2009/0144433 A1* | 6/2009 | Breau ..................... H04W 8/30 709/228 |
| 2009/0157678 A1 | 6/2009 | Turk |
| 2009/0161542 A1 | 6/2009 | Ho |
| 2009/0187649 A1 | 7/2009 | Migault et al. |
| 2009/0187915 A1 | 7/2009 | Chew et al. |
| 2009/0193126 A1 | 7/2009 | Agarwal |
| 2009/0193513 A1 | 7/2009 | Agarwal et al. |
| 2009/0196282 A1 | 7/2009 | Fellman et al. |
| 2009/0204638 A1 | 8/2009 | Hollier |
| 2009/0204649 A1 | 8/2009 | Wong et al. |
| 2009/0204650 A1 | 8/2009 | Wong et al. |
| 2009/0204705 A1 | 8/2009 | Marinov et al. |
| 2009/0210431 A1 | 8/2009 | Marinkovic et al. |

(56) References Cited

U.S. PATENT DOCUMENTS

| | | |
|---|---|---|
| 2009/0217163 A1 | 8/2009 | Jaroker |
| 2009/0217386 A1 | 8/2009 | Schneider |
| 2009/0222598 A1 | 9/2009 | Hayden |
| 2009/0228956 A1 | 9/2009 | He et al. |
| 2009/0241176 A1 | 9/2009 | Beletski et al. |
| 2009/0245135 A1 | 10/2009 | Huang |
| 2009/0245791 A1 | 10/2009 | Thaler |
| 2009/0248893 A1 | 10/2009 | Richardson |
| 2009/0248911 A1 | 10/2009 | Conroy et al. |
| 2009/0265396 A1 | 10/2009 | Ram et al. |
| 2009/0265467 A1 | 10/2009 | Peles |
| 2009/0271865 A1 | 10/2009 | Jiang |
| 2009/0282062 A1 | 11/2009 | Husic |
| 2009/0287935 A1 | 11/2009 | Aull et al. |
| 2009/0289828 A1 | 11/2009 | Hinchey |
| 2009/0292957 A1 | 11/2009 | Bower et al. |
| 2009/0296624 A1 | 12/2009 | Ryu et al. |
| 2009/0300161 A1 | 12/2009 | Pruitt et al. |
| 2009/0300407 A1 | 12/2009 | Kamath et al. |
| 2009/0310746 A1 | 12/2009 | Ye et al. |
| 2009/0316708 A1 | 12/2009 | Yahyaoui et al. |
| 2009/0317005 A1 | 12/2009 | Lee et al. |
| 2009/0319600 A1 | 12/2009 | Sedan et al. |
| 2010/0005527 A1 | 1/2010 | Jeon |
| 2010/0011434 A1 | 1/2010 | Kay |
| 2010/0017874 A1 | 1/2010 | Piccinini et al. |
| 2010/0020700 A1 | 1/2010 | Kailash |
| 2010/0023582 A1 | 1/2010 | Pedersen et al. |
| 2010/0034381 A1 | 2/2010 | Trace et al. |
| 2010/0036959 A1 | 2/2010 | Trace et al. |
| 2010/0042743 A1 | 2/2010 | Jeon et al. |
| 2010/0061232 A1 | 3/2010 | Zhou et al. |
| 2010/0061380 A1 | 3/2010 | Barach et al. |
| 2010/0064001 A1 | 3/2010 | Daily |
| 2010/0070476 A1 | 3/2010 | O'Keefe et al. |
| 2010/0071048 A1 | 3/2010 | Novak et al. |
| 2010/0077462 A1 | 3/2010 | Joffe et al. |
| 2010/0082849 A1 | 4/2010 | Millet et al. |
| 2010/0093318 A1 | 4/2010 | Zhu et al. |
| 2010/0094945 A1 | 4/2010 | Chan et al. |
| 2010/0115236 A1 | 5/2010 | Bataineh et al. |
| 2010/0122091 A1 | 5/2010 | Huang et al. |
| 2010/0131654 A1 | 5/2010 | Malakapalli et al. |
| 2010/0142382 A1 | 6/2010 | Jungck et al. |
| 2010/0150154 A1 | 6/2010 | Viger et al. |
| 2010/0151891 A1 | 6/2010 | Coelho |
| 2010/0154031 A1 | 6/2010 | Montemurro et al. |
| 2010/0165877 A1 | 7/2010 | Shukla et al. |
| 2010/0179984 A1 | 7/2010 | Sebastian |
| 2010/0188976 A1 | 7/2010 | Rahman et al. |
| 2010/0217890 A1 | 8/2010 | Nice et al. |
| 2010/0228813 A1 | 9/2010 | Suzuki et al. |
| 2010/0228814 A1 | 9/2010 | McKenna et al. |
| 2010/0228819 A1 | 9/2010 | Wei |
| 2010/0242092 A1 | 9/2010 | Harris et al. |
| 2010/0250497 A1 | 9/2010 | Redlich et al. |
| 2010/0251330 A1 | 9/2010 | Kroeselberg et al. |
| 2010/0268596 A1 | 10/2010 | Wissner |
| 2010/0274772 A1 | 10/2010 | Samuels |
| 2010/0274885 A1 | 10/2010 | Yoo et al. |
| 2010/0279733 A1 | 11/2010 | Karsten et al. |
| 2010/0299451 A1 | 11/2010 | Yigang et al. |
| 2010/0306169 A1 | 12/2010 | Pishevar et al. |
| 2010/0318508 A1 | 12/2010 | Brawer |
| 2010/0322250 A1 | 12/2010 | Shetty et al. |
| 2010/0325239 A1 | 12/2010 | Khedouri |
| 2010/0325264 A1 | 12/2010 | Crowder et al. |
| 2010/0325277 A1 | 12/2010 | Muthiah et al. |
| 2011/0013569 A1* | 1/2011 | Scherzer ............... H04W 48/14 |
| | | 707/769 |
| 2011/0032870 A1 | 2/2011 | Kumar |
| 2011/0038377 A1 | 2/2011 | Haddad |
| 2011/0040889 A1 | 2/2011 | Garrett et al. |
| 2011/0041090 A1 | 2/2011 | Seolas |
| 2011/0047620 A1 | 2/2011 | Mahaffey et al. |
| 2011/0055921 A1 | 3/2011 | Narayanaswamy et al. |
| 2011/0060824 A1 | 3/2011 | Lundstrom |
| 2011/0066718 A1 | 3/2011 | Susai et al. |
| 2011/0066736 A1 | 3/2011 | Mitchell et al. |
| 2011/0072321 A1 | 3/2011 | Dhuse |
| 2011/0075667 A1 | 3/2011 | Li et al. |
| 2011/0078131 A1 | 3/2011 | Wen |
| 2011/0078303 A1 | 3/2011 | Li et al. |
| 2011/0082896 A1* | 4/2011 | Kumar ............... H04M 7/0024 |
| | | 709/202 |
| 2011/0087696 A1 | 4/2011 | Lacapra |
| 2011/0092185 A1* | 4/2011 | Garskof ............... H04L 63/083 |
| | | 455/411 |
| 2011/0098087 A1 | 4/2011 | Tseng |
| 2011/0107077 A1 | 5/2011 | Henderson et al. |
| 2011/0113095 A1 | 5/2011 | Hatami-Hanza |
| 2011/0141893 A1* | 6/2011 | Song ............... H04L 41/5022 |
| | | 370/235 |
| 2011/0153822 A1 | 6/2011 | Rajan et al. |
| 2011/0154132 A1 | 6/2011 | Aybay |
| 2011/0154443 A1 | 6/2011 | Thakur et al. |
| 2011/0173295 A1 | 7/2011 | Bakke et al. |
| 2011/0173693 A1 | 7/2011 | Wysopal |
| 2011/0184733 A1 | 7/2011 | Yu et al. |
| 2011/0185082 A1 | 7/2011 | Thompson |
| 2011/0188415 A1 | 8/2011 | Graziano |
| 2011/0197059 A1 | 8/2011 | Klein et al. |
| 2011/0202676 A1 | 8/2011 | Craig et al. |
| 2011/0211553 A1 | 9/2011 | Haddad |
| 2011/0213911 A1 | 9/2011 | Eldus et al. |
| 2011/0238727 A1* | 9/2011 | Breau ............... H04W 8/30 |
| | | 709/202 |
| 2011/0246800 A1 | 10/2011 | Accpadi et al. |
| 2011/0247068 A1 | 10/2011 | Tolliver |
| 2011/0252303 A1 | 10/2011 | Lemonik |
| 2011/0264736 A1 | 10/2011 | Zuckerberg et al. |
| 2011/0273984 A1 | 11/2011 | Hsu et al. |
| 2011/0282997 A1 | 11/2011 | Prince et al. |
| 2011/0283018 A1 | 11/2011 | Levine et al. |
| 2011/0292857 A1 | 12/2011 | Sarikaya et al. |
| 2011/0307629 A1 | 12/2011 | Haddad |
| 2011/0314161 A1* | 12/2011 | Andreasen ......... H04L 63/0227 |
| | | 709/226 |
| 2011/0314178 A1 | 12/2011 | Kanode et al. |
| 2011/0318954 A1 | 12/2011 | Lin |
| 2011/0321122 A1 | 12/2011 | Mwangi et al. |
| 2012/0005372 A1 | 1/2012 | Sarikaya et al. |
| 2012/0016994 A1 | 1/2012 | Nakamura et al. |
| 2012/0017274 A1 | 1/2012 | Schrecker |
| 2012/0030187 A1 | 2/2012 | Marano |
| 2012/0030341 A1 | 2/2012 | Jensen et al. |
| 2012/0036580 A1 | 2/2012 | Gomy |
| 2012/0039341 A1 | 2/2012 | Latif et al. |
| 2012/0041965 A1 | 2/2012 | Vasquez et al. |
| 2012/0047571 A1 | 2/2012 | Duncan et al. |
| 2012/0054497 A1 | 3/2012 | Korhonen |
| 2012/0059934 A1 | 3/2012 | Rafiq et al. |
| 2012/0063314 A1 | 3/2012 | Pignataro et al. |
| 2012/0066489 A1 | 3/2012 | Ozaki et al. |
| 2012/0066586 A1 | 3/2012 | Shemesh |
| 2012/0071131 A1 | 3/2012 | Zisapel et al. |
| 2012/0075444 A1 | 3/2012 | Rovegno |
| 2012/0096145 A1 | 4/2012 | Le et al. |
| 2012/0101952 A1 | 4/2012 | Raleigh et al. |
| 2012/0110210 A1 | 5/2012 | Huang et al. |
| 2012/0117028 A1 | 5/2012 | Gold et al. |
| 2012/0117379 A1 | 5/2012 | Thornewell et al. |
| 2012/0117644 A1 | 5/2012 | Soeder |
| 2012/0122461 A1 | 5/2012 | Hossain et al. |
| 2012/0124372 A1 | 5/2012 | Dilley |
| 2012/0131428 A1 | 5/2012 | Tsai |
| 2012/0150805 A1 | 6/2012 | Pafumi et al. |
| 2012/0159249 A1 | 6/2012 | Son et al. |
| 2012/0174217 A1 | 7/2012 | Ormazabal |
| 2012/0191847 A1 | 7/2012 | Nas et al. |
| 2012/0195273 A1 | 8/2012 | Iwamura et al. |
| 2012/0198043 A1 | 8/2012 | Hesketh |
| 2012/0224531 A1 | 9/2012 | Karuturi et al. |
| 2012/0254293 A1 | 10/2012 | Winter et al. |

(56) References Cited

U.S. PATENT DOCUMENTS

| | | | |
|---|---|---|---|
| 2012/0257506 A1 | 10/2012 | Bazlamacci et al. | |
| 2012/0258766 A1 | 10/2012 | Cho et al. | |
| 2012/0259998 A1 | 10/2012 | Kaufman | |
| 2012/0284252 A1 | 11/2012 | Drai | |
| 2012/0284296 A1 | 11/2012 | Arifuddin et al. | |
| 2012/0290446 A1 | 11/2012 | England | |
| 2012/0311153 A1 | 12/2012 | Morgan | |
| 2012/0317266 A1 | 12/2012 | Abbott | |
| 2013/0007870 A1 | 1/2013 | Devarajan et al. | |
| 2013/0029726 A1 | 1/2013 | Berionne et al. | |
| 2013/0031060 A1 | 1/2013 | Lowery et al. | |
| 2013/0058229 A1 | 3/2013 | Casado et al. | |
| 2013/0064093 A1 | 3/2013 | Ridel et al. | |
| 2013/0065555 A1* | 3/2013 | Baker | G06Q 20/405 455/410 |
| 2013/0073401 A1 | 3/2013 | Cook | |
| 2013/0086688 A1 | 4/2013 | Patel | |
| 2013/0091002 A1 | 4/2013 | Christie et al. | |
| 2013/0100815 A1 | 4/2013 | Kakadia et al. | |
| 2013/0103805 A1 | 4/2013 | Lyon | |
| 2013/0151268 A1* | 6/2013 | Fletcher | G16H 20/10 705/2 |
| 2013/0151725 A1 | 6/2013 | Baginski et al. | |
| 2013/0163758 A1 | 6/2013 | Swaminathan | |
| 2013/0166715 A1 | 6/2013 | Yuan et al. | |
| 2013/0167245 A1 | 6/2013 | Birtwhistle | |
| 2013/0173756 A1* | 7/2013 | Luna | H04L 43/0876 709/219 |
| 2013/0182713 A1 | 7/2013 | Giacomoni et al. | |
| 2013/0185166 A1* | 7/2013 | Larkin | G06Q 20/20 705/21 |
| 2013/0198322 A1 | 8/2013 | Oran et al. | |
| 2013/0201999 A1 | 8/2013 | Savolainen et al. | |
| 2013/0205035 A1 | 8/2013 | Chen | |
| 2013/0205040 A1 | 8/2013 | Naor et al. | |
| 2013/0205361 A1 | 8/2013 | Narayanaswamy et al. | |
| 2013/0212464 A1 | 8/2013 | Kimura | |
| 2013/0219030 A1 | 8/2013 | Szabo | |
| 2013/0238472 A1 | 9/2013 | Fan et al. | |
| 2013/0268604 A1* | 10/2013 | Gupta | H04W 8/06 709/206 |
| 2013/0276126 A1 | 10/2013 | Zhou | |
| 2013/0305041 A1* | 11/2013 | Bar-El | H04L 63/083 713/156 |
| 2013/0335010 A1 | 12/2013 | Wu et al. | |
| 2013/0336122 A1 | 12/2013 | Baruah et al. | |
| 2013/0340079 A1 | 12/2013 | Gottlieb et al. | |
| 2014/0032758 A1* | 1/2014 | Barton | H04L 41/00 709/225 |
| 2014/0040478 A1 | 2/2014 | Hsu et al. | |
| 2014/0059678 A1 | 2/2014 | Parker | |
| 2014/0071895 A1 | 3/2014 | Bane et al. | |
| 2014/0082482 A1 | 3/2014 | Seolas | |
| 2014/0089671 A1* | 3/2014 | Logue | H04L 63/0884 713/182 |
| 2014/0095661 A1 | 4/2014 | Knowles et al. | |
| 2014/0095874 A1* | 4/2014 | Desai | H04L 63/0815 713/168 |
| 2014/0099945 A1 | 4/2014 | Singh et al. | |
| 2014/0105069 A1 | 4/2014 | Potnuru | |
| 2014/0108249 A1* | 4/2014 | Kulpati | G06Q 20/16 705/44 |
| 2014/0108792 A1* | 4/2014 | Borzycki | H04L 67/567 713/165 |
| 2014/0123295 A1 | 5/2014 | Kuykendall | |
| 2014/0143300 A1* | 5/2014 | Karlsson | H04L 47/10 709/203 |
| 2014/0157351 A1* | 6/2014 | Canning | H04W 12/37 726/1 |
| 2014/0162705 A1 | 6/2014 | De wit et al. | |
| 2014/0164893 A1 | 6/2014 | Pariente | |
| 2014/0169173 A1 | 6/2014 | Naouri | |
| 2014/0171089 A1 | 6/2014 | Janakiraman et al. | |
| 2014/0173094 A1* | 6/2014 | Majumdar | H04L 43/028 709/224 |
| 2014/0187199 A1 | 7/2014 | Yan et al. | |
| 2014/0214759 A1 | 7/2014 | Williams | |
| 2014/0222967 A1* | 8/2014 | Harrang | H04L 65/612 709/219 |
| 2014/0245185 A1 | 8/2014 | Knodt | |
| 2014/0267345 A1 | 9/2014 | Toth et al. | |
| 2014/0269484 A1 | 9/2014 | Dankberg et al. | |
| 2014/0270401 A1* | 9/2014 | Irwin | G06Q 20/405 382/115 |
| 2014/0283078 A1 | 9/2014 | Redfoot | |
| 2014/0286316 A1 | 9/2014 | Park et al. | |
| 2014/0317404 A1 | 10/2014 | Carlson et al. | |
| 2014/0359098 A1* | 12/2014 | Xu | H04L 63/0838 709/223 |
| 2014/0376470 A1 | 12/2014 | Mahkonen | |
| 2015/0032753 A1 | 1/2015 | Yang | |
| 2015/0058595 A1 | 2/2015 | Gura et al. | |
| 2015/0082438 A1 | 3/2015 | Prieto Alvarez | |
| 2015/0082440 A1 | 3/2015 | Pickett | |
| 2015/0163234 A1 | 6/2015 | Tai | |
| 2015/0173123 A1 | 6/2015 | Luessem | H04L 65/1069 370/328 |
| 2015/0215832 A1* | 7/2015 | Fitzpatrick | H04W 48/14 455/426.1 |
| 2015/0242508 A1 | 8/2015 | Brawer | |
| 2015/0242852 A1* | 8/2015 | Goldstone | G06Q 20/401 705/44 |
| 2015/0294511 A1 | 10/2015 | Nishioka et al. | |
| 2015/0302093 A1 | 10/2015 | Jacob | |
| 2015/0324478 A1 | 11/2015 | Zhao | |
| 2015/0327205 A1* | 11/2015 | Lisboa | H04L 51/04 455/411 |
| 2016/0041866 A1 | 2/2016 | Oleynikov | |
| 2016/0044520 A1* | 2/2016 | Iyer | H04W 24/08 370/252 |
| 2016/0048670 A1* | 2/2016 | Kim | G06V 40/1353 382/125 |
| 2016/0104116 A1 | 4/2016 | Greenberg | |
| 2016/0127898 A1* | 5/2016 | Gupta | G06F 21/43 726/7 |
| 2016/0149904 A1* | 5/2016 | Kim | G06F 21/32 713/186 |
| 2016/0021396 A1 | 6/2016 | Metzler et al. | |
| 2016/0154774 A1 | 6/2016 | Kolam et al. | |
| 2016/0192165 A1* | 6/2016 | Agulnik | H04L 67/52 455/404.2 |
| 2016/0219039 A1* | 7/2016 | Houthooft | H04L 63/0815 |
| 2016/0234520 A1 | 8/2016 | Goel | |
| 2016/0234521 A1 | 8/2016 | Goel | |
| 2016/0275043 A1 | 9/2016 | Grochowski et al. | |
| 2016/0285633 A1* | 9/2016 | Allinson | H04L 63/0853 |
| 2016/0314299 A1* | 10/2016 | Almer | H04W 12/37 |
| 2017/0039552 A1* | 2/2017 | O'Regan | G06Q 20/40 |
| 2017/0091733 A1 | 3/2017 | Brown | |
| 2017/0093843 A1 | 3/2017 | Schaefer | |
| 2017/0127061 A1 | 5/2017 | Miyamoto | |
| 2017/0332080 A1 | 11/2017 | Houze et al. | |

FOREIGN PATENT DOCUMENTS

| | | |
|---|---|---|
| CA | 2512312 A1 | 7/2004 |
| EP | 605088 A3 | 7/1994 |
| EP | 0 738 970 A1 | 10/1996 |
| EP | 744850 A2 | 11/1996 |
| EP | 1081918 A2 | 3/2001 |
| EP | 1813084 | 8/2007 |
| EP | 3467676 A1 | 10/2019 |
| GB | 2516729 A | 2/2015 |
| JP | 63010250 A | 1/1988 |
| JP | 06-205006 | 7/1994 |
| JP | 06-332782 | 12/1994 |
| JP | 8021924 B | 3/1996 |
| JP | 08-328760 | 12/1996 |
| JP | 08-339355 | 12/1996 |
| JP | 9016510 A | 1/1997 |
| JP | 11282741 A | 10/1999 |

(56) References Cited

FOREIGN PATENT DOCUMENTS

| | | |
|---|---|---|
| JP | 2000183935 | 6/2000 |
| JP | 2004334530 A | 11/2004 |
| NZ | 566291 A | 12/2008 |
| WO | WO 91/14326 | 9/1991 |
| WO | WO 95/05712 | 2/1995 |
| WO | WO 97/09805 | 3/1997 |
| WO | WO 97/45800 | 12/1997 |
| WO | WO 99/05829 | 2/1999 |
| WO | WO 99/06913 | 2/1999 |
| WO | WO 99/10858 | 3/1999 |
| WO | WO 99/39373 | 8/1999 |
| WO | WO 99/64967 | 12/1999 |
| WO | WO 00/04422 | 1/2000 |
| WO | WO 00/04458 | 1/2000 |
| WO | WO 00/58870 A2 | 10/2000 |
| WO | WO 02/39696 A2 | 5/2002 |
| WO | WO 02/056181 A2 | 7/2002 |
| WO | WO 2004/061605 A2 | 7/2004 |
| WO | WO 2006/055494 | 5/2006 |
| WO | WO 2006/091040 A1 | 8/2006 |
| WO | WO 2008/130983 A1 | 10/2008 |
| WO | WO 2008/147973 A2 | 12/2008 |
| WO | WO 2009052668 | 4/2009 |
| WO | WO 2009155969 | 12/2009 |

OTHER PUBLICATIONS

F5 Networks Inc. "F5 Big-IP Access Policy Manager Operations Guide 1.0" F5 Networks Inc., May 3, 2015, pp. 1-122.
F5 Networks Inc., "Big IP® Global Traffic Manager™: Implementations" F5 Networks Inc., Nov. 19, 2014, Version 11.4, pp. 1-234.
"Secure64 DNS Signer," <www.secure64.com>, 2 pages. (2008).
"Who is Xelerance," <http://www.xelerance.com>, slides 1-6. (2007).
Crescendo Networks, "Application Layer Processing" (ALP), Chapter 9, CN-5000E/5500E, pp. 168-186 (2003-2009).
"DNSX; DNSX Secure Signer; DNSSEC Management Solution," <http://www.xelerance.com/dnssec>.pp. 1-9. (2009).
Nguyen, Quang Vinh, Mao Lin Huang, Kang Zhang, and I-Ling Yen. "A visualization model for web sitemaps." In International Conference on Computer Graphics, Imaging and Visualisation (CGIV'06), pp. 12-17. IEEE, 2006. (Year: 2006).
Jain, Garima, and Yatin Mehandiratta. "Chronicle security against covert crawling." In Proceedings of the First International Conference on Security of Internet of Things, pp. 42-50. 2012. (Year: 2012).
Saiedian, Hossein, and Dan Broyle. "Security vulnerabilities in the same-origin policy: Implications and alternatives." Computer 44, No. 9 (2011): 29-36. (Year: 2011).
Saxena, Aditi, Akarshi Arora, Saumya Saxena, and Ashwni Kumar. "Detection of web attacks using machine learning based URL classification techniques." In 2022 2nd International Conference on IntelligentTechnologies (CONIT), pp. 1-13. IEEE, 2022. (Year: 2022).
"A Process For Selective Routing of Servlet Content To Transcoding Modules," Research Disclosure 422124, IBM Corporation, pp. 889-890, Jun. 1999. (2 pages).
"A Storage Architecture Guide," Second Edition, 2001, Auspex Systems, Inc., www.auspex.com, last accessed on Dec. 30, 2002.
"BIG-IP Controller with Exclusive OneConnect Content Switching Feature Provides a Breakthrough System for Maximizing Server and Network Performance," F5 Networks, Inc. Press Release, May 8, 2001, 2 pages, Las Vegas, Nevada.
"Cavium Networks Product Selector Guide—Single & Multi-Core MIPS Processors, Security Processors and Accelerator Boards," at http://www.caviumnetworks.com, Spring 2008, pp. 1-44, Cavium Networks, Mountain View, CA, US.
"Comtech AHA Announces 3.0 Gbps GZIP Compression/Decompression Accelerator—AHA362-PCIX offers high-speed GZIP compression and decompression," www.aha.com, Apr. 20, 2005, pp. 1-2, Comtech AHA Corporation, Moscow, ID, USA.
"Comtech AHA Announces GZIP Compression and Decompression IC—Offers the highest speed and compression ratio performance in hardware on the market," www.aha.com, Jun. 26, 2007, pp. 1-2, Comtech AHA Corporation, Moscow, ID, USA.
"CSA Persistent File System Technology," A White Paper, Jan. 1, 1999, p. 1-3, http://www.cosoa.com/white_papers/pfs.php, Colorado Software Architecture, Inc.
"Diameter MBLB Support Phase 2: Generic Message Based Load Balancing (GMBLB)", last accessed Mar. 29, 2010, pp. 1-10, (http://peterpan.f5net.com/twiki/bin/view/TMOS/TMOSDiameterMBLB).
"Distributed File System: A Logical View of Physical Storage: White Paper," 1999, Microsoft Corp, www.microsoft.com, <http://www.eu.microsoft.com/TechNet/prodtechnol/windows2000serv/maintain/DFSnt95>, pp. 1-26, last accessed on Dec. 20, 2002.
"DNS DDOS Protection Functional Spec," BigipDNSDDOSProtectionFS<TMO<TWiki, last accessed Mar. 31, 2010, 2 pages.
"DNSSEC Functional Spec," TMOSDnsSECFS<TMOS<TWiki, last accessed on Mar. 31, 2010, pp. 1-10.
"DNSX; DNSX Secure Signer; DNSSEC Management Solution," <http://www.xelerance.com/dnssec>.pp. 1-9.
"Market Research & Releases, CMPP PoC documentation", last accessed Mar. 29, 2010, (http://mainstreet/sites/PD/Teams/ProdMgmt/MarketResearch/Universal).
"Market Research & Releases, Solstice Diameter Requirements", last accessed Mar. 29, 2010, (http://mainstreet/sites/PD/Teams/ProdMgmt/MarketResearch/Universal).
"NERSC Tutorials: I/O on the Cray T3E, 'Chapter 8, Disk Striping'," National Energy Research Scientific Computing Center (NERSC), http://hpcfnersc.gov, last accessed on Dec. 27, 2002.
"NitroxTm XL Security Acceleration Modules—PCI 3V or 3V/5V-Universal Boards for SSL and IPSec," at http://www.Caviumnetworks.com, (2002) pp. 1, Cavium Networks, Mountain View, CA USA.
"PCI, PCI-X," at http://www.cavium.com/accelerationboards_PCIPCI-X.htm, Downloaded Oct. 2008, 1 page, Cavium Networks—Products > Acceleration Boards > PCI, PCI-X.
"PDRICDR for RQ-GTM-0000028," BigipDNSDDOSProtectionPDR<TMOS<TVViki, last accessed on Mar. 31, 2010, pp. 1-14.
"Ready For Prime Time", Forrester Consulting, Jul. 2010, pp. 1-22, Cambridge DNSSEC, MA.
"Respond to server depending on TCP::client_port", DevCentral Forums iRules, pp. 1-6, last accessed Mar. 26, 2010, (http://devcentral.f5.com/Default/aspx?tabid=53&forumid=5&tpage=1&v).
"Scaling Next Generation Web Infrastructure with Content-Intelligent Switching: White Paper," Apr. 2000, p. 1-9 Alteon Web Systems, Inc.
"Secure64 DNS Signer," <www.secure64.com>, 2 pages.
"Servlet/Applet/HTML Authentication Process With Single Sign-On," Research Disclosure 429128, IBM Corporation, pp. 163-164, Jan. 2000. (2 pages).
"The AFS File System in Distributed Computing Environment," www.transarc.ibm.com/Library/whitepapers/AFS/afsoverview.html, last accessed on Dec. 20, 2002.
"Traffic Surges; Surge Queue; Netscaler Defense" 2005 Citrix Systems Inc., PowerPoint Presentation, slides 1-12.
"UDDI Overview", Sep. 6, 2000, pp. 1-21, uddi.org, (http://www.uddi.org/).
"UDDI Technical White Paper," Sep. 6, 2000, pp. 1-12, uddi-org, (http://www.uddi.org/).
"UDDI Version 3.0.1", UDDI Spec Technical Committee Specification, Oct. 14, 2003, pp. 1-383, uddi.org, (http://www.uddi.org/).
"VERITAS SANPoint Foundation Suite(tm) and SANPoint Foundation Suite(tm) HA: New VERITAS Volume Management and File System Technology for Cluster Environments," Sep. 2001, VERITAS Software Corp.
"Who is Xelerance," <http://www.xelerance.com>, slides 1-6.
"Windows Clustering Technologies—An Overview," Nov. 2001, Microsoft Corp., www.microsoft.com, last accessed on Dec. 30, 2002.

(56) References Cited

OTHER PUBLICATIONS

"Windows Server 2003 Kerberos Extensions," Microsoft TechNet, 2003 (Updated Jul. 31, 2004), http://technet. microsoft.com/en-us/library/cc738207, Microsoft Corporation.
Abad, C., et al., "An Analysis on the Schemes for Detecting and Preventing ARP Cache Poisoning Attacks", IEEE, Computer Society, 27th International Conference on Distributed Computing Systems Workshops (ICDCSW'07), 2007, pp. 1-8.
Aguilera, Marcos K. et al., "Improving recoverability in multi-tier storage systems," International Conference on Dependable Systems and Networks (DSN-2007), Jun. 2007, 10 pages, Edinburgh, Scotland.
Alteon WebSystems, Inc., Gigabit Ethernet/PCI Network Interface Card Host/NIC Software Interface Definition, Rev. 12.4.13, Jul. 1999.
Anderson et al., "Serverless Network File System," in the 151h Symposium on Operating Systems Principles, Dec. 1995, Association for Computing Machinery, Inc.
Anderson, Darrell C. et al., "Interposed Request Routing for Scalable Network Storage," ACM Transactions on Computer Systems 20(1): (Feb. 2002), pp. 1-24.
Anonymous, "How DFS Works: Remote File Systems," Distributed File System (DFS) Technical Reference, retrieved from the Internet on Feb. 13, 2009: URL<:http://technetmicrosoft.com/en-us/library/cc782417WS.10,printer).aspx> (Mar. 2003).
Apple, Inc., "Mac OS X Tiger Keynote Intro. Part 2," Jun. 2004, www.youtube.com <http://www.youtube.com/watch?v=zSBJwEmRJbY>, p. 1.
Apple, Inc., "Tiger Developer Overview Series: Working with Spotlight," Nov. 23, 2004, www.apple.com using www.archive.org <http://web.archive.org/web/20041123005335/developer.apple.com/macosx/tiger/spotlight.html>, pp. 1-6.
Arends R., et al., "DNS Security Introduction and Requirements", Network Working Group, RFC 4033, Mar. 2005, pp. 1-20.
Arends R., et al., "Protocol Modifications for the DNS Security Extensions", Network Working Group, RFC 4035, Mar. 2005, pp. 1-54.
Arends R., et al., "Resource Records for the DNS Security Extensions", Network Working Group, RFC 4034, Mar. 2005, pp. 1-28.
Aura T., "Cryptographically Generated Addresses (CGA)", Network Working Group, RFC 3972, Mar. 2005, pp. 1-21.
Baer, T., et al., "The elements of Web services" ADTmag.com, Dec. 1, 2002, pp. 1-6, (http://www.adtmag.com).
Bagnulo et al., "DNS 64: DNS extensions for Network Address Translation from IPv6 Clients to IPv4 Servers," Internet draft, Jul. 2010, pp. 1-31, IETF Trust.
Bagnulo, M., et al., "DN864: DNS Extensions for Network Address Translation from IPv6 Clients to IPv4 Servers", Internet Engineering Task Force (IETF), Apr. 2011, pp. 1-32.
Barron's Tech Trader Daily, "Apple, Google: Franken Drafts Mobile Privacy Bill", retrieved on Jun. 16, 2012 from http://blogs.barrons.com/techtraderdaily/2011/06/15/apple-google-franken-drafts-mobile-privacy-bill (2011).
Basney et al., "Credential Wallets: A Classification of Credential Repositories Highlighting MyProxy," Sep. 19-21, 2003, pp. 1-20, 31st Research Conference on Communication, Information and Internet Policy (TPRC 2003), Arlington, Virginia.
Bau et al., "A Security Evaluation of DNSSEC with NSEC3," Mar. 2, 2010; updated version corrects and supersedes a paper in the NDSS' 10 proceedings, pp. 1-18.
Bell Laboratories, "Layer 4/7 Switching and Other Custom IP Traffic Processing Using the NEPPI API," Bell Laboratories, Lucent Technologies, Murray Hill, NJ 07974 USA, pp. 1-11 (2000).
Blue Coat, "Technology Primer: CIFS Protocol Optimization," Blue Coat Systems Inc., 2007, pp. 1-3, (http://www.bluecoat.com).
Botzum, Keys, "Single Sign On—A Contrarian View," Aug. 6, 2001, pp. 1-8, Open Group Website, http://www.opengroup.org/security/topics.htm.
Cabrera et al., "Swift: A Storage Architecture for Large Objects," In Proceedings of the—Eleventh IEEE Symposium on Mass Storage Systems, Oct. 1991, pp. 123-128.
Cabrera et al., "Swift: Using Distributed Disk Striping to Provide High I/O Data Rates," Fall 1991, pp. 405-436, vol. 4, No. 4, Computing Systems.
Cabrera et al., "Using Data Striping in a Local Area Network," 1992, technical report No. UCSC-CRL-92-09 of the Computer & Information Sciences Department of University of California at Santa Cruz.
Callaghan et al., "NFS Version 3 Protocol Specifications" (RFC 1813), Jun. 1995, The Internet Engineering Task Force (IETN), www.ietf.org, last accessed on Dec. 30, 2002.
Carns et al., "PVFS: A Parallel File System For Linux Clusters," in Proceedings of the Extreme Linux Track: 4th Annual Linux Showcase and Conference, Oct. 2000, pp. 317-327, Atlanta, Georgia, USENIX Association
Carpenter, B., "Transmission of IPv6 over IPv4 Domains without Explicit Tunnels", Network Working Group, RFC 2529, Mar. 1999, pp. 1-10.
Cavale, M. R., "Introducing Microsoft Cluster Service (MSCS) in the Windows Server 2003", Microsoft Corporation, Nov. 2002.
Crescendo Networks, "Application Layer Processing" (ALP), Chapter 9, CN-5000E/5500E, pp. 168-186.
Eastlake D., "Domain Name System Security Extensions", Network Working Group, RFC 2535, Mar. 1999, pp. 1-44.
English Translation of Notification of Reason(s) for Refusal for JP 2002-556371 (dated Jan. 22, 2007).
EVENTHELIX.com, "DMA and Interrupt Handling," at http://www.eventhelix.com/RealtimeMantra/FaultHandling/dma_interrupt_handling.htm (Downloaded Oct. 2009).
EVENTHELIX.com, "TCP-Transmission Control Protocol (TCP Fast Retransmit and Recovery)," (Mar. 2002).
F5 Networks, "F5 Delivers Advanced Web Security Solutions to Help Customers Efficiently Address Threats to Web Applications and Enhanced Business Performance", F5 News, Press & Events, retrieved on Apr. 25, 2011 from http:www.f5.com/news-press-events/press/2009/20091116b.html (2009).
F5 Networks, "F5 Enhances IP Geolocation Capability Through Partnership With Quova", News, Press & Events, retrieved on Apr. 25, 2011 from http://www.f5.com/news-press-events/press/2009/20091116c.html (2009).
F5 Networks, "Quova", retrieved on Apr. 22, 2011 from http://www.f5.com/solutions/technology-alliances/infrastructure/quova.html (2011).
F5 Networks, Inc. "FS BIG-IP Access Policy Manager Operations Guide 1.0" F5 Networks Inc., May 3, 2015, pp. 1-122.
F5 Networks, Inc., "3-DNS® Reference Guide, version 4.5", F5 Networks Inc., Sep. 2002, pp. 2-1-2-28, 3-1-3-12, 5-1-5-24, Seattle, Washington.
F5 Networks, Inc. "BIG-IP® Application Security ManagexTM; Implementations" F5 Networks. Inc., Jan. 28, 2014, 11.5, pp. 1-396.
F5 Networks, Inc., "BIG IP® Global Traffic Manager™: Implementations" F5 Networks Inc., Feb. 22, 2014, Version 11.4, pp. 1-106.
F5 Networks, Inc., "BIG IP® Local Traffic Manager™: Implementations" F5 Networks Inc., Nov. 19, 2014, Version 11.4, pp. 1-234.
F5 Networks, Inc., "BIG-IP Global Traffic Manager and BIG-IP Link Controller: Implementations," Manual 0304-00, Dec. 3, 2009, pp. 1-161, version 10.1, F5 Networks, Inc.
F5 Networks, Inc., "BIG-IP Systems: Getting Started Guide," Manual 0300-00, Feb. 4, 2010, pp. 1-102, version 10.1, F5 Networks, Inc.
F5 Networks, Inc., "BIG-IP® Global Traffic Manager," F5 Networks Inc., <http://www.f5.com/products/big-ip/product-modules/global-traffic-manager.html>, last accessed Jul. 6, 2010, 2 pages.
F5 Networks, Inc., "Big-IP® Reference Guide, version 4.5", F5 Networks Inc., Sep. 2002, pp. 11-1-11-32, Seattle, Washington.
F5 Networks, Inc., "BIG-IP® TMOS®: Implementations", F5 Networks, Inc., Sep. 2, 2014, Version 11.3, pp. 1-208.
F5 Networks, Inc., "BIG-IP® TMOSEI: Implementations" F5 Networks Inc., May 5, 2015, Version 11.4, pp. 1-234.

(56) References Cited

OTHER PUBLICATIONS

F5 Networks, Inc., "BIG-IP® WebAccelerator™ System: Implementations", F5 Networks. Inc., Dec. 4, 2012, Version 11.3, pp. 1-166.

F5 Networks, Inc., "Case Information Log for 'Issues with BoNY upgrade to 4.3'", as early as Feb. 2008.

F5 Networks, Inc., "Configuration Guide for Local Traffic Management," F5 Networks Inc., Jan. 2006, version 9.2.2, 406 pgs.

F5 Networks, Inc., "Deploying the BIG-IP LTM for Diameter Traffic Management," F5® Deployment Guide, Publication date Sep. 2010, Version 1.2, pp. 1-19.

F5 Networks, Inc., "Detail Requirement Report: RQ-GTM-0000024," <http://fpweb/fptopic.asp?REQ=RQ-GTM-0000024>, F5 Networks, Inc., 1999, printed Mar. 31, 2010, 2 pages.

F5 Networks, Inc., "Detail Requirement Report: RQ-GTM-0000028," <http://fpweb/fptopic.asp?REQ=RQ-GTM-0000028>, F5 Networks, Inc., 1999, printed Mar. 31, 2010, 2 pages.

F5 Networks, Inc., "DNS DDOS Protection Functional Spec," BigipDNSDDOSProtectionFS<TMO<TWiki, last accessed Mar. 31, 2010, pp. 1- 2.

F5 Networks, Inc., "DNS Security (DNSSEC) Solutions," <http://www.f5.com/solutions/security/dnssec>, F5 Networks, Inc., printed Aug. 23, 2010, pp. 1-4.

F5 Networks, Inc., "F5 and Infoblox Provide Customers with Complete DNS Security Solution," <http://www.f5. cominews-press-events/press/2010/20100301.html>, Mar. 1, 2010, 2 pages, F5 Networks, Inc., Seattle and Santa Clara, California.

F5 Networks, Inc., "F5 Diameter RM", Powerpoint document, Jul. 16, 2009, pp. 1-7.

F5 Networks, Inc., "F5 Solutions Enable Government Organizations to Meet 2009 DNSSEC Compliance," <http:// www.f5.com/news-press-events/press/2009/20091207.html>, Dec. 7, 2009, 2 pages, F5 Networks, Inc., Seattle, California.

F5 Networks, Inc., "F5 WANJet CIFS Acceleration", White Paper, F5 Networks Inc., Mar. 2006, pp. 1-5, Seattle, Washington.

F5 Networks, Inc., "Routing Global Internet Users to the Appropriate Data Center and Applications Using F5's 3-DNS Controller", F5 Networks Inc., Aug. 2001, pp. 1-4, Seattle, Washington, (http://www.f5.com/f5producs/3dns/relatedMaterials/UsingF5.html).

F5 Networks, Inc., "Using F5's-DNS Controller To Provide High Availability Between Two or More Data Centers", F5 Networks Inc., Aug. 2001, pp. 1-4, Seattle, Washington, (http://www.f5.com/f5products/3dns/relatedMaterials/3DNSRouting.html).

Fajardo V., "Open Diameter Software Architecture," Jun. 25, 2004, pp. 1-6, Version 1.0.7.

Fan et al., "Summary Cache: A Scalable Wide-Area Protocol", Computer Communications Review, Association Machinery, New York, USA, Oct. 1998, vol. 28, Web Cache Sharing for Computing No. 4, pp. 254-265.

Farley, M., "Building Storage Networks," Jan. 2000, McGraw Hill, ISBN 0072130725.

Fielding et al., "Hypertext Transfer Protocol—HTTP/1 1", Network Working Group, RFC: 2068, Jan. 1997, pp. 1-162.

Fielding et al., "Hypertext Transfer Protocol—HTTP/1 1", Network Working Group, RFC: 2616, Jun. 1999, pp. 1-176.

Floyd et al., "Random Early Detection Gateways for Congestion Avoidance," Aug. 1993, pp. 1-22, IEEE/ACM Transactions on Networking, California.

Gibson et al., "File Server Scaling with Network-Attached Secure Disks," in Proceedings of the ACM International Conference on Measurement and Modeling of Computer Systems (Sigmetrics '97), Association for Computing Machinery, Inc., Jun. 15-18, 1997.

Gibson et al., "NASD Scalable Storage Systems," Jun. 1999, USENIX99, Extreme Linux Workshop, Monterey, California.

Gupta et al., "Algorithms for Packet Classification", Computer Systems Laboratory, Stanford University, CA, Mar./Apr. 2001, pp. 1-29.

Hagino J., et al., "An IPv6-to-IPv4 Transport Relay Translator", Network Working Group, RFC 3142, Jun. 2001, pp. 1-11.

Harrison, C., May 19, 2008 response to Communication pursuant to Article 96(2) EPC dated Nov. 9, 2007 in corresponding European patent application No. 02718824.2.

Harman, "Intrepid Update 1998", 1998, IEEE, pp. 147-153.

Hartman, J., "The Zebra Striped Network File System," 1994, Ph.D. dissertation submitted in the Graduate Division of the University of California at Berkeley.

Harvey, "DMA Fundamentals on Various PC Platforms," National Instruments, Application Note 011, pp. 1-18 (Apr. 1991).

Haskin et al., "The Tiger Shark File System," 1996, in proceedings of IEEE, Spring COMPCON, Santa Clara, CA, www.research.ibm.com, last accessed on Dec. 30, 2002.

Heinz G., "Priorities in Stream Transmission Control Protocol (SCTP) Multistreaming", Thesis submitted to the Faculty of the University of Delaware, Spring 2003, pp. 1-35.

Higgins, Kelly Jackson, "Internet Infrastructure Reaches Long-Awaited Security Milestone," Dark Reading, Tech Center: Security Services, <http//www.darkreading.com/securityservices/security/management/showArticle.jhtml?article> Jul. 28, 2010. pp. 1-4.

Hochmuth, Phil, "F5, CacheFlow puma up content-delivery lines," Network World Fusion, May 4, 2001, 1 page, Las Vegas, Nevada.

Howarth, Fran, "Investing in security versus facing the consequences," White Paper by Bloor Research, Sep. 2010, pp. 1-15.

http://lwn.net/images/pdf/LDD3/ch15.pdf, "Memory Mapping and DMA," Chapter 15, pp. 412-463 (Jan. 2005).

Hu, J., Final Office action dated Sep. 21, 2007 for related U.S. Appl. No. 10/336,784.

Hu, J., Office action dated Feb. 6, 2007 for related U.S. Appl. No. 10/336,784.

Hwang et al., "Designing SSI Clusters with Hierarchical Checkpointing and Single 1/0 Space," IEEE Concurrency, Jan.-Mar. 1999, pp. 60-69.

Ilvesmaki M., et al., "On the capabilities of application level traffic measurements to differentiate and classify Internet traffic", Presented in SPIE's International Symposium ITcom, Aug. 19-21, 2001, pp. 1-11, Denver, Colorado.

Imielinski, T., et al., "GPS-Based Addressing and Routing", retrieved on Feb. 12, 2012 from http://tools.ietf.org/html/frc2009 (2009).

International Search Report and Written Opinion for International Patent Application No. PCT/US2013/026478 (dated Jun. 3, 2013).

International Search Report and The Written Opinion, for International Patent Application No. PCT/US2011/058469, dated May 30, 2012.

International Search Report and The Written Opinion, for International Patent Application No. PCT/US2013/026615, dated Jul. 4, 2013.

International Search Report for International Patent Application No. PCT/US2012/044995 (dated Oct. 4, 2012).

International Search Report for International Patent Application No. PCT/US2008/083117 (dated Jun. 23, 2009).

International Search Report for International Patent Application No. PCT/US2008/060449 (dated Apr. 9, 2008)

International Search Report for International Patent Application No. PCT/US2008/064677 (dated Sep. 6, 2009).

International Search Report for International Patent Application No. PCT/US02/00720, dated Jul. 8, 2004.

International Search Report from International Application No. PCT/US03/41202, dated Sep. 15, 2005.

Internet Protocol, "Darpa Internet Program Protocol Specification", (RFC:791), Information Sciences Institute, University of Southern California, Sep. 1981, pp. 1-49.

Kaminsky, Dan, "Black Ops of Fundamental Defense: Introducing the Domain Key Infrastructure," <http:llwww. slideshare.net/RecursionVentures/dki-2>, Aug. 2010, slides 1-116.

Karamanolis, C. et al., "An Architecture for Scalable and Manageable File Services," HPL-2001-173, Jul. 26, 2001. p. 1-114.

Katsurashima, W. et al., "NAS Switch: A Novel CIFS Server Virtualization, Proceedings," 20th IEEE/11th NASA Goddard Conference on Mass Storage Systems and Technologies, 2003 (MSST 2003), Apr. 2003.

Kawamoto, D., "Amazon files for Web services patent", CNET News.com, Jul. 28, 2005, pp. 1-2, (http://news.com).

(56) References Cited

OTHER PUBLICATIONS

Kimball, C.E. et al., "Automated Client-Side Integration of Distributed Application Servers," 13Th LISA Conf., 1999, pp. 275-282 of the Proceedings.

Klayman, J., Response filed by Japanese associate to office action dated Jan. 22, 2007 in corresponding Japanese patent application No. 2002-556371.

Klayman, J., Nov. 13, 2008 e-mail to Japanese associate including instructions for response to office action dated May 26, 2008 in corresponding Japanese patent application No. 2002-556371.

Klayman, J., Jul. 18, 2007 e-mail to Japanese associate including instructions for response to office action dated Jan. 22, 2007 in corresponding Japanese patent application No. 2002-556371.

Kohl et al., "The Kerberos Network Authentication Service (V5)," RFC 1510, Sep. 1993. (http://www.ietf.org/ rfc/rfc1510.txt?number=1510).

Korkuzas, V., Communication pursuant to Article 96(2) EPC dated Sep. 11, 2007 in corresponding European patent application No. 02718824.2-2201.

LaMonica M., "Infravio spiffs up Web services registry idea", CNET News.com, May 11, 2004, pp. 1-2, (http://www.news.com).

Laurie et al., "DNS Security (DNSSEC) Hashed Authenticated Denial of Existence," Network Working Group, RFC 5155, Feb. 2008, pp. 1-51.

Lelil, S., "Storage Technology News: AutoVirt adds tool to help data migration projects," Feb. 25, 2011, last accessed Mar. 17, 2011, <http://searchstorage.techtarget.com/news/article/0,289142,sid5_gci1527986,00.html>.

Li, Z., et al., "Recommendation for DNSG4-based NAT64 Round Robin Load-balancing draft-li-behave-dns64-load-balancing-02" behave, Internet-Draft, Oct. 31, 2011, pp. 1-11.

Long et al., "Swift/RAID: A distributed RAID System", Computing Systems, Summer 1994, vol. 7, pp. 333-359.

Mac Vittie, L., "Message-Based Load Balancing: Using F5 solutions to address the challenges of scaling Diameter, RADIUS, and message-oriented protocols", F5 Technical Brief, 2005, pp. 1-9, F5 Networks Inc., Seattle, Washington.

MacVittie, L., "Cookies, Sessions and Persistence", F5 Networks Inc., F5 White Paper, Jul. 2, 2008, pp. 1-7.

MacVittie, L., "Geolocation and Application Delivery", F5 Networks White Paper, pp. 1-8 (2010).

MacVittie, Lori, "It's DNSSEC Not DNSSUX," DevCentral>Weblogs, <http://devcentral.f5.com/weblogs/macvittie/ archive/2009/11/18/itsquos-dnssec-not-dnssux.aspx>, posted on Nov. 18, 2009, accessed on Jul. 6, 2010, pp. 3-7.

Mangino, "Using DMA with High Performance Peripherals to Maximize System Performance," WW TMS470 Catalog Applications, at hnp://focus.ti.com/lit/wp/spna105/spna105.pdf (Jan. 2007).

Modiano E., "Scheduling Algorithms for Message Transmission Over a Satellite Broadcast System," MIT Lincoln Laboratory Advanced Network Group, Nov. 1997, pp. 1-7.

Moeller, "Automated Detection of Client-State Manipulation Vulnerabilities", ACM Transactions on Software Engineering and Methodology, vol. 23, No. 4, Aug. 2014, 30 pages.

Mogul, "The Case for Persistent-Connection HTTP," SIGCOMM, Cambridge, MA USA pp. 299-313 (Oct. 1995).

Netgear GA620 Gigabit Ethernet Card Driver Source Code, printed on Oct. 22, 2007.

Nichols K., et al., "Definition of the Differentiated Services Field (DS Field) in the IPv4 and IPv6 Headers", (RFC:2474) Network Working Group, Dec. 1998, pp. 1-19, (http://www.ietf.org/rfc/rfc2474.txt).

Noghani et al., "A Novel Approach to Reduce Latency on the Internet: 'Component-Based Download'," Proceedings of the Computing, Las Vegas, NV, Jun. 2000, pp. 1-6 on the Internet: Intl Conf. on Internet.

Norton et al., "CIFS Protocol Version CIFS-Spec 0.9," 2001, Storage Networking Industry Association (SNIA), www.snia.org, last accessed on Mar. 26, 2001.

Novotny et al., "An Online Credential Repository for the Grid: MyProxy," 2001, pp. 1-8.

Ott D., et al., "A Mechanism for TCP-Friendly Transport-level Protocol Coordination", USENIX Annual Technical Conference, 2002, University of North Carolina at Chapel Hill, pp. 1-12.

OWASP, "Testing for Cross site scripting", OWASP Testing Guide v2, Table of Contents, Feb. 24, 2011, pp. 1-5, (www.owasp.org/index.php/Testing_for_Cross_site_scripting).

Padmanabhan V., et al., "Using Predictive Prefetching to Improve World Wide Web Latency", SIGCOM, 1996, pp. 1-15.

Pashalidis et al., "A Taxonomy of Single Sign-On Systems," 2003, pp. 1-16, Royal Holloway, University of London, Egham Surray, TW20, 0EX, United Kingdom.

Pashalidis et al., "Impostor: A Single Sign-On System for Use from Untrusted Devices," Global Telecommunications Conference, 2004, GLOBECOM '04, IEEE, Issue Date: Nov. 29-Dec. 3, 2004.Royal Holloway, University of London.

Patterson et al., "A case for redundant arrays of inexpensive disks (RAID)", Chicago, Illinois, Jun. 1-3, 1998, in Proceedings of ACM SIGMOD conference on the Management of Data, pp. 109-116, Association for Computing Machinery, Inc., www.acm.org, last accessed on Dec. 20, 2002.

Pearson, P.K., "Fast Hashing of Variable-Length Text Strings," Comm. of the ACM, Jun. 1990, pp. 1-4, vol. 33, No. 6.

Peterson, M., "Introducing Storage Area Networks," Feb. 1998, InfoStor, www.infostor.com, last accessed on Dec. 20, 2002.

Preslan et al., "Scalability and Failure Recovery in a Linux Cluster File System," in Proceedings of the 4th Annual Linux Showcase & Conference, Atlanta, Georgia, Oct. 10-14, 2000, pp. 169-180 of the Proceedings, www.usenix.org, last accessed on Dec. 20, 2002.

Rabinovich et al., "DHTTP: An Efficient and Cache-Friendly Transfer Protocol for the Web," IEEE/ACM Transactions on Networking 12(6):1007-20 (Dec. 2004).

Raghavan B., et al., "Cloud Control with Distributed Rate Limiting", SIGCOMM'07, Aug. 27-31, 2007, pp. 1-11, Department of Computer Science and Engineering, University of California, San Diego, CA.

Response filed Jul. 6, 2007 to Office action dated February 6, 2007 for related U.S. Appl. No. 10/336,784.

Response filed Mar. 20, 2008 to Final Office action dated Sep. 21, 2007 for related U.S. Appl. No. 10/336,784.

Rodriguez et al., "Parallel-access for mirror sites in the Internet," InfoCom 2000. Nineteenth Annual Joint Conference of the IEEE Computer and Communications Societies. Proceedings. IEEE Tel Aviv, Israel Mar. 26-30, 2000, Piscataway, NJ, USA, IEEE, US, Mar. 26, 2000 (Mar. 26, 2000), pp. 864-873, XP010376176 ISBN: 0-7803-5880-5 p. 867, col. 2, last paragraph—p. 868, col. 1, paragraph 1.

Rosen E., et al., "MPLS Label Stack Encoding", (RFC:3032) Network Working Group, Jan. 2001, pp. 1-22, (http://www.ietf.org/rfc/rfc3032.txt).

RSYNC, "Welcome to the RSYNC Web Pages," Retrieved from the Internet URL: http://samba.anu.edu.ut.rsync/. (Retrieved on Dec. 18, 2009).

Salchow, Jr., KJ, "Clusrered Multiprocessing: Changing the Rules of the Performance Game," F5 White Paper, Jan. 2008, pp. 1-11, F5 Networks, Inc.

Savage, et al., "AFRAID—A Frequently Redundant Array of Independent Disks," Jan. 22-26, 1996, pp. 1-13, USENIX Technical Conference, San Diego, California.

Schaefer, Ken, "IIS and Kerberos Part 5—Protocol Transition, Constrained Delegation, S4U2S and S4U2P," Jul. 18, 2007, 21 pages, http://www.adopenstatic.com/cs/blogs/ken/archive/2007/07/19/8460.aspx.

Schilit B., "Bootstrapping Location-Enhanced Web Services", University of Washington, Dec. 4, 2003, (http://www.cs.washington.edu/news/colloq.info.html).

Secure64, "Secure64 DNS Signer", <http://www.secure64.com>, Data sheet, Jun. 22, 2011, V3.1., 2 pages.

Seeley R., "Can Infravio technology revive UDDI?", ADTmag.com, Oct. 22, 2003, (http://www.adtmag.com).

Shohoud, Y., "Building XML Web Services with VB .NET and VB 6", Addison Wesley, 2002, pp. 1-14.

(56) References Cited

OTHER PUBLICATIONS

Silva, Peter, "DNSSEC: The Antidote to DNS Cache Poisoning and Other DNS Attacks," F5 Technical Brief, 2009, pp. 1-10.
Sleeper B., "The Evolution of UDDI", UDDI.org White Paper, The Stencil Group, Inc., Jul. 19, 2002, pp. 1-15, San Francisco, California.
Sleeper B., "Why UDDI Will Succeed, Quietly: Two Factors Push Web Services Forward", The Stencil Group, Inc., Apr. 2001, pp. 1-7, San Francisco, California.
Snoeren A., et al., "Managing Cloud Resources: Distributed Rate Limited", Building and Programming the Cloud Workshop, Jan. 13, 2010, pp. 1-38, UCSDCSE Computer Science and Engineering.
Soltis et al., "The Design and Performance of a Shared Disk File System for IRIX," Mar. 23-26, 1998, pp. 1-17, Sixth NASA Goddard Space Flight Center Conference on Mass Storage and Technologies in cooperation with the Fifteenth IEEE Symposium on Mass Storage Systems, University of Minnesota.
Soltis et al., "The Global File System," Sep. 17-19, 1996, in Proceedings of the Fifth NASA Goddard Space Flight Center Conference on Mass Storage Systems and Technologies, College Park, Maryland.
Sommers F., "Whats New in UDDI 3.0—Part 1", Web Services Papers, Jan. 27, 2003, pp. 1-4, (http://www.webservices.org/index.php/article/articleprint/871/-1/24/).
Sommers F., "Whats New in UDDI 3.0—Part 2", Web Services Papers, Mar. 2, 2003, pp. 1-8, (http://www.web.archive.org/web/20040620131006/).
Sommers F., "Whats New in UDDI 3.0—Part 3", Web Services Papers, Sep. 2, 2003, pp. 1-4, (http://www.webservices.org/index.php/article/articleprint/894/-1/24/).
Sorenson, K.M., "Installation and Administration: Kimberlite Cluster Version 1.1.0, Rev. Dec. 2000," Mission Critical Linux, http://oss.missioncriticallinux.com/kimberlite/kimberlite.pdf.
Stakutis, C., "Benefits of SAN-based file system sharing," Jul. 2000, pp. 1-4, InfoStor, www.infostor.com, last accessed on Dec. 30, 2002.
Stevens, "TCP Slow Start, Congestion Avoidance, Fast Retransmit, and Fast Recovery Algorithms," Standards Track Memo pp. 1-6 (Jan. 1997).
Tatipamula M., et al., "IPv6 Integration and Coexistence Strategies for Next-Generation Networks", IEEE Communications Magazine, Jan. 2004, pp. 88-96.
The Wall Street Journal, "Apple, Google Collect User Data", retrieved on Apr. 25, 2011 on http://online.wsj.com/articletSB10001424052748703983704576277101723453610.html (2011).
Thekkath et al., "Frangipani: A Scalable Distributed File System," in Proceedings of the 16th ACM Symposium on Operating Systems Principles, Oct. 1997, pp. 1-14, Association for Computing Machinery, Inc.
Thomson et al., "DNS Extensions to Support IP Version 6," The Internet Society, Network Working Group, RFC 3596, Oct. 2003, pp. 1-8.
Tulloch, Mitch, "Microsoft Encyclopedia of Security," 2003, pp. 218, 300-301, Microsoft Press, Redmond, Washington.
Uesugi, H., Nov. 26, 2008 amendment filed by Japanese associate in response to office action dated May 26, 2008 in corresponding Japanese patent application No. 2002-556371.
Uesugi, H., English translation of office action dated May 26, 2008 in corresponding Japanese patent application No. 2002-556371.
Uesugi, H., Jul. 15, 2008 letter from Japanese associate reporting office action dated May 26, 2008 in corresponding Japanese patent application No. 2002-556371.
W3C, "Geolocation API Specification W3C Candidate Recommendation Sep. 7, 2010", retrieved on Nov. 1, 2010 from http://www.w3.org/TR/geolocation-API/ (2010).
W3C, "Geolocation API Specification W3C Working Draft Jul. 7, 2009", retrieved on Nov. 1, 2010 from http://www.w3.org/TR/2009/WD-geolocation--API-20090707/ (2009).
Wadge, "Achieving Gigabit Performance on Programmable Ethernet Network Interface Cards," pp. 1-9 (May 2001).
Wang B., "Priority and realtime data transfer over the best-effort Internet", Dissertation Abstract, 2005, ScholarWorks@UMASS.
Welch, "A User's Guide to TCP Windows," pp. 1-5 (Jun. 1996).
Wikipedia, "Diameter (protocol)", pp. 1-11, last accessed Oct. 27, 2010, (http://en.wikipedia.org/wiki/Diameter_(protocol)).
Wikipedia, "Direct Memory Access," at http://en.wikipedia.org/wild/Direct_memory_access, pp. 1-6 (Downloaded Oct. 2009).
Wikipedia, "Domain Name System Security Extensions," <http://en.wikipedia.org/wiki/DNSSEC>, accessed Jun. 3, 2010, pp. 1-20.
Wikipedia, "IPv6", <http:llen.wikipedia.org/wiki/IPv6>, accessed Jun. 3, 2010, 1 page.
Wikipedia, "List of DNS record types," <http://en.wikipedia.org/wiki/List_of_DNS_record_types>, Jun. 2010, pp. 1-6.
Wikipedia, "Nagle's Algorithm," at Nagle's Algorithm—Wikeopedia.xps (Last Modified Oct. 2009).
Wilkes, J., et al., "The HP AutoRAID Hierarchical Storage System," Feb. 1996, vol. 14, No. 1, ACM Transactions on Computer Systems.
Williams et al., The Ultimate Windows Server 2003 System Administrator's Guide: Forwarding 2003, 2 pages, Figure 10.7, Addison-Wesley Professional, Boston, Massachusetts.
Woo T.Y.C., "A Modular Approach to Packet Classification: Algorithms and Results", Nineteenth Annual Conference of the IEEE Computer and Communications Societies 3(3):1213-22, Mar. 26-30, 2000, abstract only, (http://ieeexplore.ieee.org/xpl/freeabs_all.jsp?arnumber=832499).
Xelerance, "Who is Xelerance", <http://www.xerlerance.com>, Jul. 20, 2007, slides 1-17.
Zayas, E., "AFS-3 Programmer's Reference: Architectural Overview," Transarc Corp., version 1.0 of Sep. 2, 1991, doc. No. FS-00-D160.
Zhang, a, et al., "Considerations on NAT64 Load-Balancing draft-zhang-behave-nat64-load-balancing-03", Network Working Group, Jul. 11, 2011, pp. 1-17, Huawei Technologies Co., Ltd.
Chunlong, Fan, et al., "An evaluating method of spider detection techniques by trap." In 2010 2nd International Conference on Future Computer and Communication, vol. 1, pp. V1-823, IEEE, 2010.

\* cited by examiner

METHODS FOR MANAGING L7 TRAFFIC CLASSIFICATION AND DEVICES THEREOF

This application claims the benefit of U.S. Provisional Patent Application Ser. No. 62/024,906 filed on Jul. 15, 2014, which is hereby incorporated by reference in its entirety.

FIELD

This technology generally relates to methods and devices for network traffic management and, more particularly, to methods for managing layer seven (L7) network classification and devices thereof.

BACKGROUND

Prior technologies have allowed network administrators to visualize and classify computer network traffic based on source and destination addresses and also based on the operating performance of the managing servers. Additionally, prior technologies have performed pattern matching on the network traffic in order to identify the type of the traffic, and apply logging or policy enforcement based on the type of the traffic to classify the network traffic.

SUMMARY

A method for classifying network traffic includes receiving, by an access manager computing device, a request to access a service by a mobile computing device. Next, application layer network traffic from the requesting mobile computing device is classified by an access manager computing device based on mobile data associated with the requesting mobile computing device. One or more actions are performed by an access manager computing device based on the classification.

A non-transitory computer readable medium having stored thereon instructions for classifying network traffic comprising machine executable code which when executed by at least one processor, causes the processor to perform steps includes receiving a request to access a service by a mobile computing device. Next, application layer network traffic from the requesting mobile computing device is classified based on mobile data associated with the requesting mobile computing device. One or more actions are performed based on the classification.

An access manager computing device including at least one of configurable hardware logic configured to be capable of implementing or a processor coupled to a memory and configured to execute programmed instructions stored in the memory for receiving a request to access a service by a mobile computing device. Next, application layer network traffic from the requesting mobile computing device is classified based on mobile data associated with the requesting mobile computing device. One or more actions are performed based on the classification.

This technology provides a number of advantages including providing a method, non-transitory computer readable medium and apparatus that assists with method for managing L7 network traffic classification. By using the information associated with a mobile computing device, the technology disclosed can effectively classify and manage network traffic.

DETAILED DESCRIPTION

Figure 1:
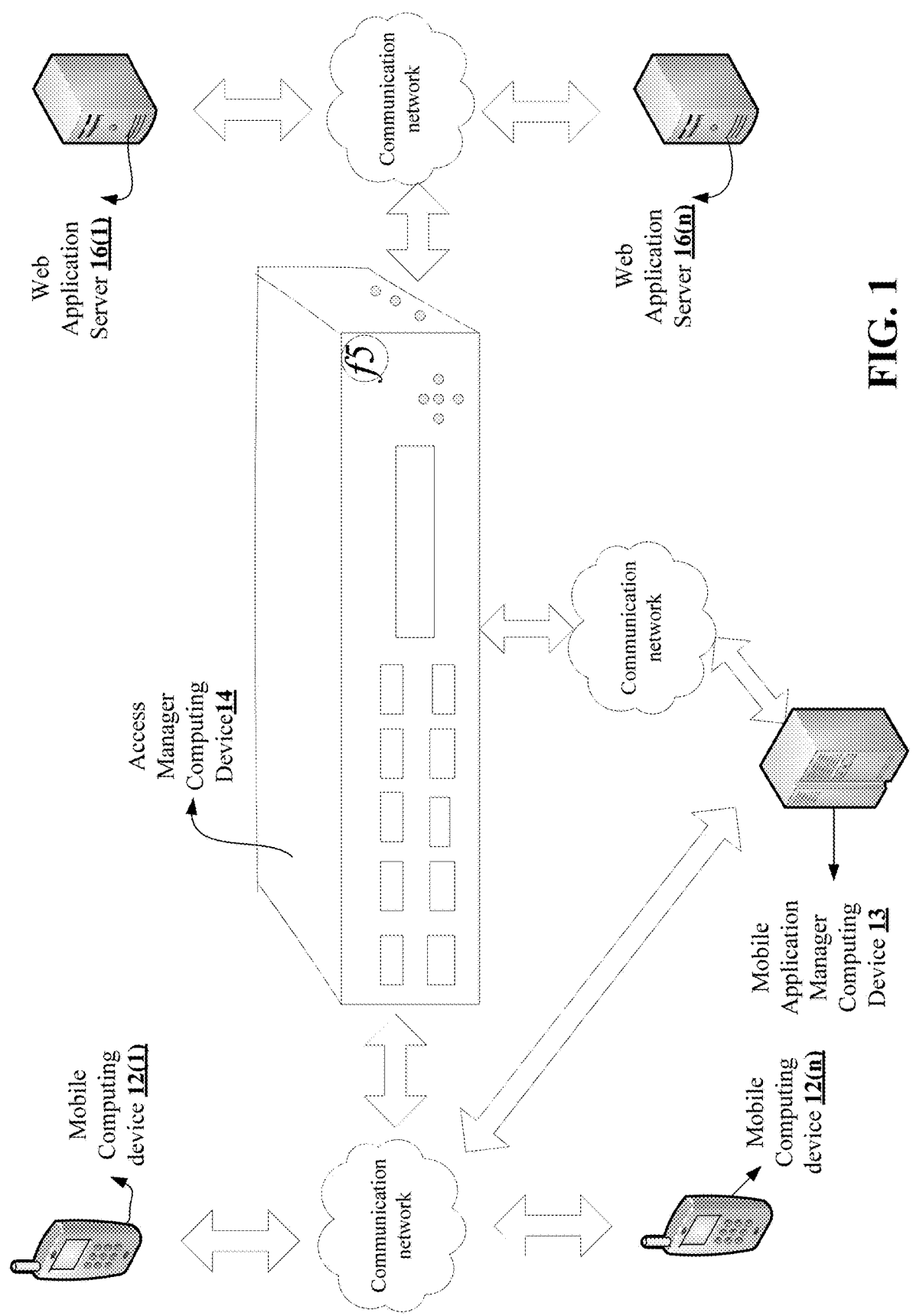
FIG. 1 is an example of a block diagram of an environment including a access manager computing device for managing network traffic.
Figure 2:
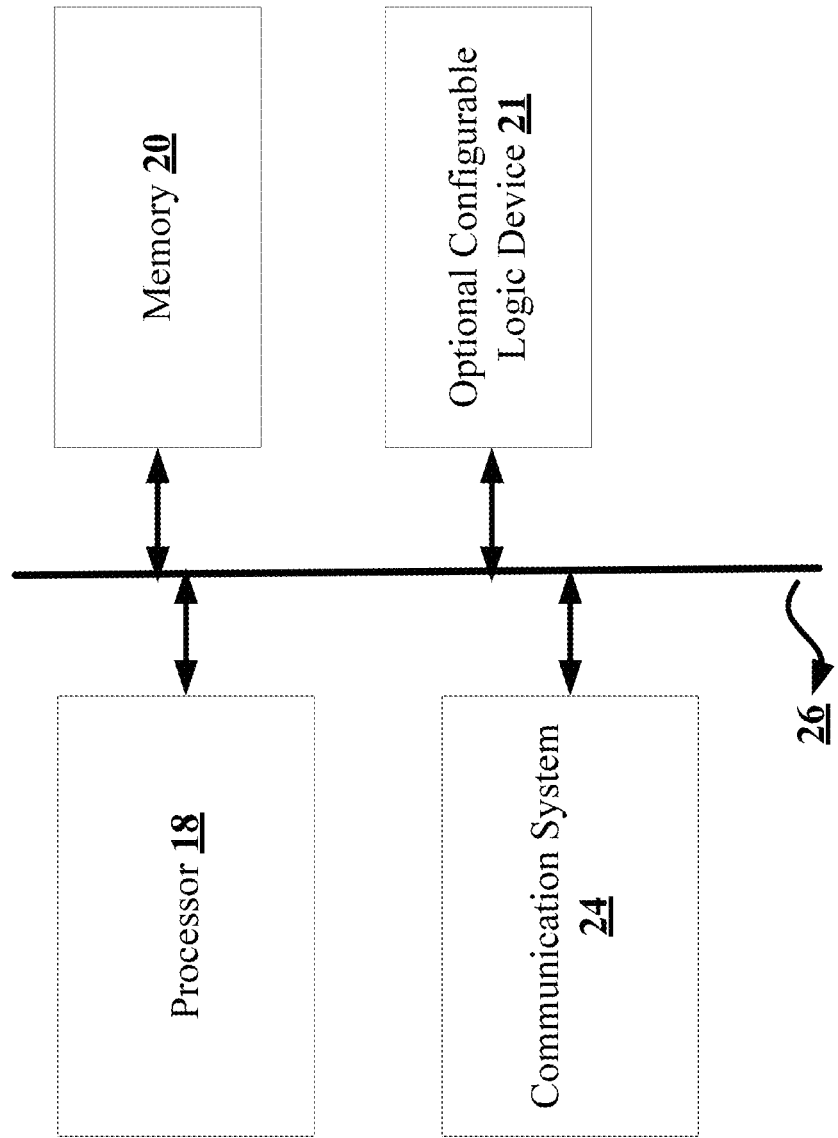
FIG. 2 is an example of a block diagram of a access manager computing device.

An example of a network environment 10 with an access manager computing device 14 for managing layer seven (L7) network classification is illustrated in FIGS. 1 and 2. The exemplary environment 10 includes a plurality of mobile computing devices 12(1)-12(n), a mobile application manager computing device 13, an access manager computing device 14, and a plurality of web application servers 16(1)-16(n) which are coupled together by communication networks 30, although the environment can include other types and numbers of systems, devices, components, and/or elements and in other topologies and deployments. While not shown, the exemplary environment 10 may include additional network components, such as routers, switches and other devices, which are well known to those of ordinary skill in the art and thus will not be described here. This technology provides a number of advantages including providing management of layer seven (L7) or the application layer network classification.

Referring more specifically to FIGS. 1 and 2, the access manager computing device 14 is coupled to the plurality of mobile computing devices 12(1)-12(n) through the communication network 30, although the plurality of mobile computing devices 12(1)-12(n) and access manager computing device 14 may be coupled together via other topologies. Additionally, the access manager computing device 14 is coupled to the plurality of web application servers 16(1)-16(n) through the communication network 30, although the plurality of web application servers 16(1)-16(n) and access manager computing device 14 may be coupled together via other topologies.

The access manager computing device 14 assists with managing application layer seven (L7) network classifications as illustrated and described by way of the examples herein, although access manager computing device 14 may perform other types and/or numbers of functions. As illustrated in FIG. 2, the access manager computing device 14 may include a processor or central processing unit (CPU) 18, a memory 20, optional configurable hardware logic 21, and a communication system 24 which are coupled together by a bus 26, although the access manager computing device 14 may comprise other types and numbers of elements in other configurations. In this example, the bus 26 is a hyper-transport bus in this example, although other bus types and links may be used, such as PCI.

The processor 18 within the access manager computing device 14 may execute one or more computer-executable instructions stored in the memory 20 for the methods illustrated and described with reference to the examples herein, although the processor can execute other types and numbers of instructions and perform other types and numbers of operations. The processor 18 may comprise one or more central processing units ("CPUs") or general purpose processors with one or more processing cores, such as AMD® processor(s), although other types of processor(s) could be used (e.g., Intel®).

Figure 6:
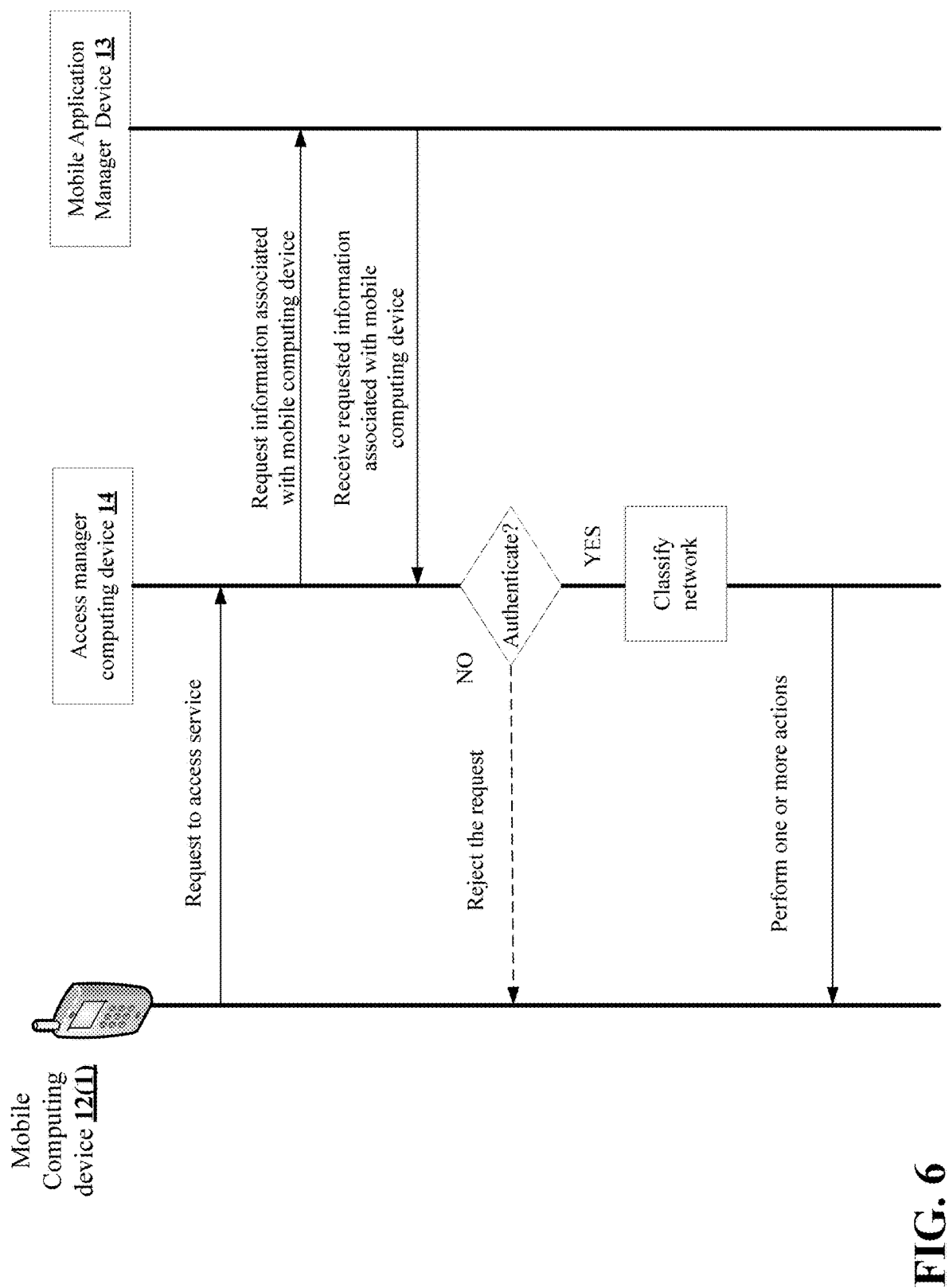
FIG. 6 is an exemplary sequence flow diagram for managing L7 network traffic classification.

Memory 20 within the access manager computing device 14 may comprise one or more tangible storage media, such as RAM, ROM, flash memory, CD-ROM, floppy disk, hard disk drive(s), solid state memory, DVD, or any other memory storage types or devices, including combinations thereof, which are known to those of ordinary skill in the art. The memory 20 may store one or more non-transitory computer-readable instructions of this technology as illustrated and described with reference to the examples herein that may be executed by the processor 18. The exemplary flowcharts shown in FIGS. 3 and 4 and the exemplary sequence flow diagrams shown in FIGS. 6 and 7 are representative of example steps or actions of this technology that may be embodied or expressed as one or more non-transitory computer or machine readable instructions stored in memory 20 that may be executed by the processor 18 and/or may be implemented by configured logic in the optional configurable logic 21.

The optional configurable hardware logic 21 in the access manager computing device 14 may comprise specialized hardware configured to implement one or more steps of this technology as illustrated and described with reference to the examples herein. By way of example only, the optional configurable logic hardware device 21 may comprise one or more of field programmable gate arrays ("FPGAs"), field programmable logic devices ("FPLDs"), application specific integrated circuits (ASICs") and/or programmable logic units ("PLUs").

The communication system 24 in the access manager computing device 14 is used to operatively couple and communicate between the access manager computing device 14, the plurality of mobile computing devices 12(1)-12(n), the mobile application manger computing device 13 and the plurality of web application servers 16(1)-16(n) which are all coupled together by communication network 30 such as one or more local area networks (LAN) and/or the wide area network (WAN), although other types and numbers of communication networks or systems with other types and numbers of connections and configurations to other devices and elements. By way of example only, the communication network such as local area networks (LAN) and the wide area network (WAN) can use TCP/IP over Ethernet and industry-standard protocols, including NFS, CIFS, SOAP, XML, LDAP, and SNMP, although other types and numbers of communication networks, can be used. In this example, the bus 26 is a hyper-transport bus in this example, although other bus types and links may be used, such as PCI.

Each of the plurality of mobile computing devices 12(1)-12(n), include a central processing unit (CPU) or processor, a memory, input/display device interface, configurable logic device and an input/output system or I/O system, which are coupled together by a bus or other link. The plurality of mobile computing devices 12(1)-12(n), in this example, may run interface mobile applications, such as Web browsers, that may provide an interface to make requests for and send and/or receive data to and/or from the plurality of web application servers 16(1)-16(n) via the access manager computing device 14 or may run one or more network administration related applications to manage the network, although other types of application may also run on the plurality of mobile computing devices 12(1)-12(n). Each of the plurality of mobile computing devices 12(1)-12(n) utilizes the access manager computing device 14 to conduct one or more operations with the plurality of web application servers 16(1)-16(n), such as to obtain data from one of the plurality of web application servers 16(1)-16(n), request an application to be retrieved from the plurality of web application servers 16(1)-16(n) or manage network administration using one or more mobile applications executing on the plurality of mobile computing devices 12(1)-12(n), by way of example only, although other numbers and/or types of systems could be utilizing these resources and other types and numbers of functions utilizing other types of protocols could be performed.

The mobile application manager computing device 13 includes a processor, a memory, and a communication interface which are coupled together by a bus, although the mobile application manager computing device 13 may include other types and numbers of elements in other configurations. By way of example only, the mobile application manager computing device 13 may perform any type and/or number of functions or operations including enforcing access policies on the plurality of mobile computing devices 12(1)-12(n) by way of example only, although the mobile application manager computing device 13 can perform other types and/or numbers of other functions and/or operations.

Each of the plurality of web application servers 16(1)-16(n) include a central processing unit (CPU) or processor, a memory, and a communication system, which are coupled together by a bus or other link, although other numbers and/or types of network devices could be used. Generally, the plurality of web application servers 16(1)-16(n) process requests for providing access to one or more enterprise web applications received from the plurality of mobile computing devices 12(1)-12(n) the access manager computing device 14 via the communication network 30 according to the HTTP-based application RFC protocol or the CIFS or NFS protocol in this example, but the principles discussed herein are not limited to this example and can include other application protocols. A series of applications may run on the plurality servers 16(1)-16(n) that allows the transmission of applications requested by the plurality of mobile computing devices 12(1)-12(n) or the access manager computing device 14. The plurality of web application servers 16(1)-16(n) may provide data or receive data in response to requests directed toward the respective applications on the plurality of web application servers 16(1)-16(n) from the plurality of mobile computing devices 12(1)-12(n) or the access manager computing device 14. It is to be understood that the plurality of web application servers 16(1)-16(n) may be hardware or software or may represent a system with multiple external resource servers, which may include internal or external networks. In this example the plurality of web application servers 16(1)-16(n) may be any version of Microsoft® IIS servers or Apache® servers, although other types of servers may be used.

Although an exemplary environment 10 with the plurality of mobile computing devices 12(1)-12(n), the mobile application manager computing device 13, the access manager computing device 14, and the plurality of web application servers 16(1)-16(n), communication networks 30 are described and illustrated herein, other types and numbers of systems, devices, blades, components, and elements in other topologies can be used. It is to be understood that the systems of the examples described herein are for exemplary purposes, as many variations of the specific hardware and software used to implement the examples are possible, as will be appreciated by those skilled in the relevant art(s).

Furthermore, each of the systems of the examples may be conveniently implemented using one or more general purpose computer systems, microprocessors, digital signal processors, and micro-controllers, programmed according to the teachings of the examples, as described and illustrated herein, and as will be appreciated by those of ordinary skill in the art.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples may also be embodied as a non-transitory computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein. Examples of methods for managing L7 network classification will now be illustrated with reference to FIGS. 1-6.

Figure 3:
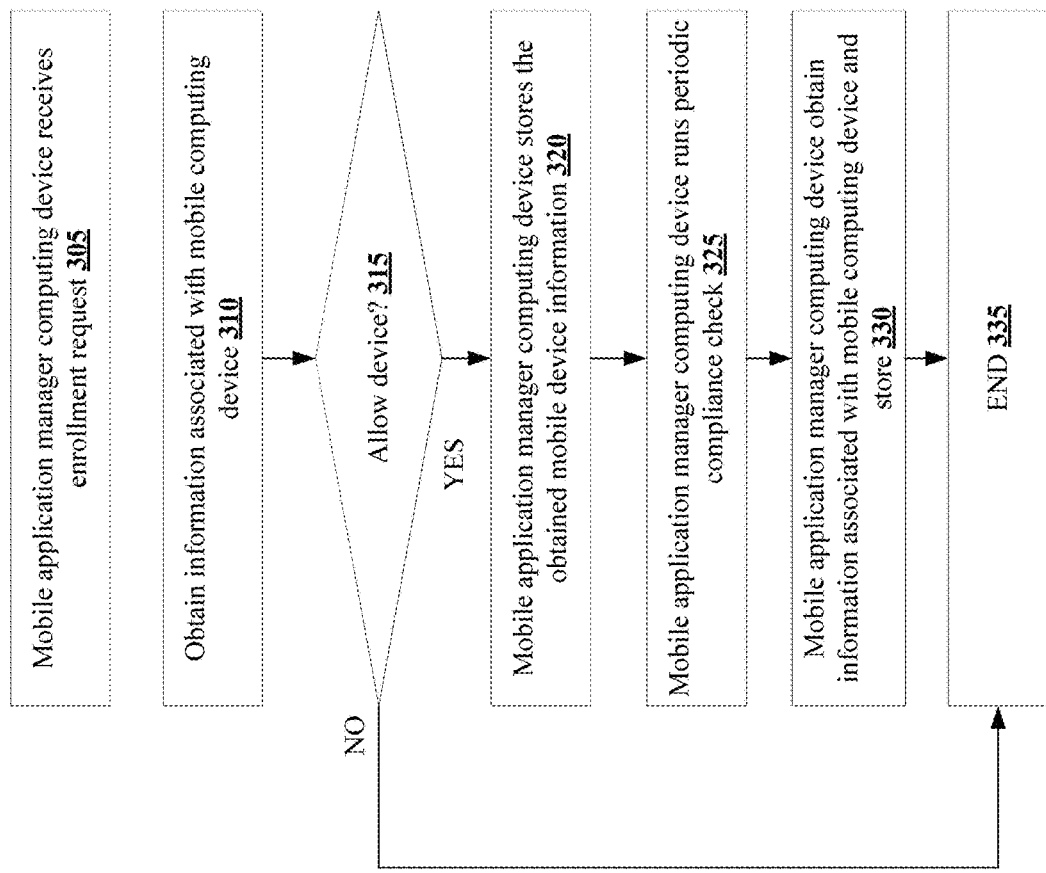
FIG. 3 is an exemplary flowchart of a method for enrolling a mobile computing device.
Figure 5:
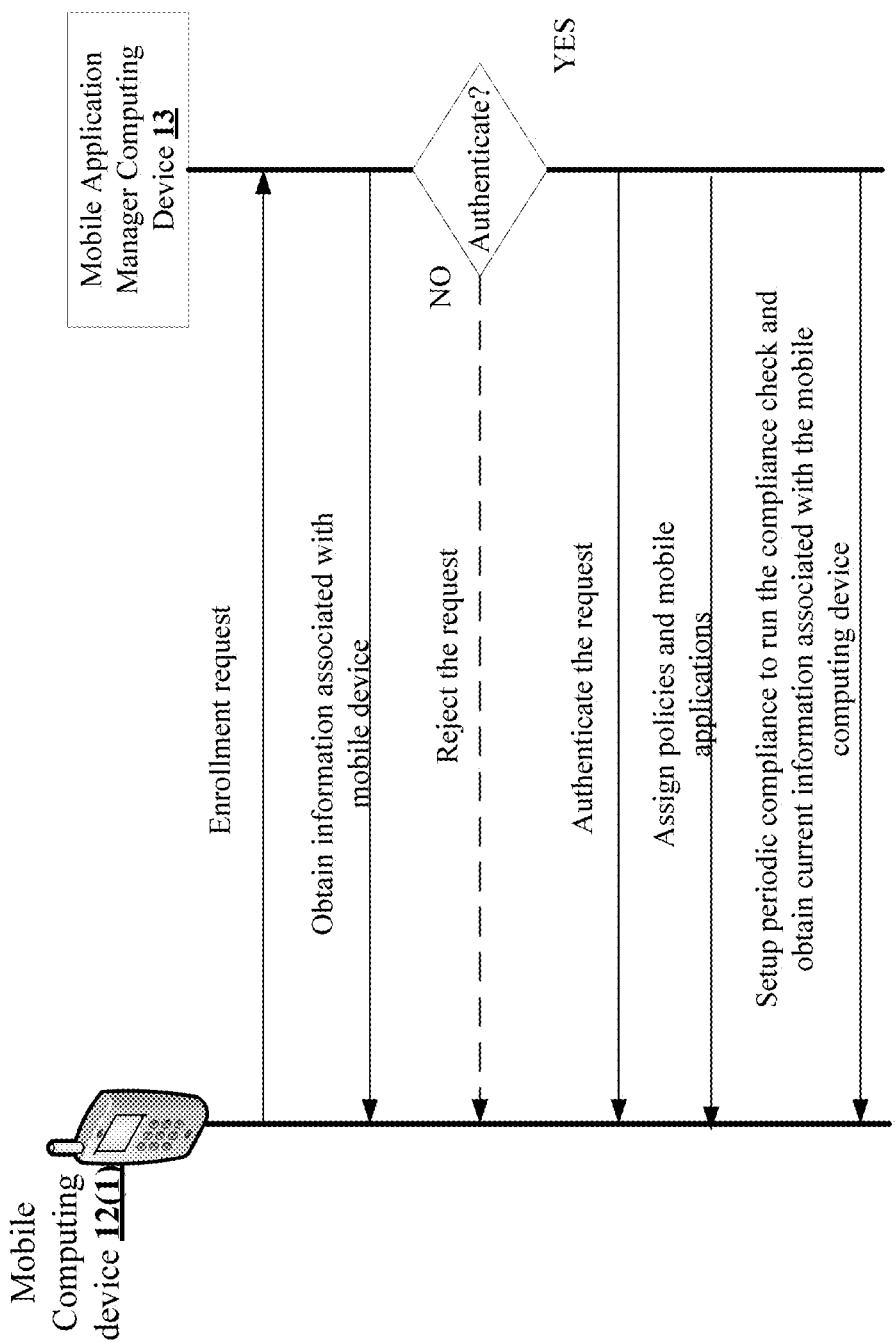
FIG. 5 is an exemplary sequence flow diagram for enrolling the mobile computing device.

First, an exemplary method for enrolling the plurality of mobile computing devices 12(1)-12(n) will now be illustrated with reference to FIGS. 3 and 5. In this particular example the method begins at step 305 of FIG. 3 with the mobile application manager device 13 receiving an enrollment request from one of the plurality of mobile computing devices 12(1)-12(n), although the mobile application manager device 13 can receive other types and/or amounts of enrollment data from the plurality of mobile computing devices 12(1)-12(n). By way of example only, the mobile application manager device 13 receives the user credentials of the user of the requesting one of the plurality of mobile computing devices 12(1)-12(n) as the enrollment data, although the mobile application management device 13 can receive other types and/or amounts of data and other information.

Next in step 310, the mobile application manager device 13 obtains the enrollment data associated with the requesting one of the plurality of mobile computing devices 12(1)-12(n) from the received enrollment request, although the mobile application manager computing device 13 can directly obtain the enrollment data from the requesting one of the plurality of mobile computing devices 12(1)-12(n). By way of example only, the enrollment data associated with the requesting one of the plurality of mobile computing devices 12(1)-12(n) may relate to a type of the requesting one of the plurality of mobile computing devices 12(1)-12(n), a version of the operating system executing on the requesting one of the plurality of mobile computing devices 12(1)-12(n), a type or types of mobile applications executing on the requesting one of the plurality of mobile computing devices 12(1)-12(n), a type or types of web browser on the requesting one of the plurality of mobile computing devices 12(1)-12(n), and/or one or more security policies on the requesting one of the plurality of mobile computing devices 12(1)-12(n), although the mobile application manager device 13 can obtain other types or amounts of information associated with the requesting one of the plurality of mobile computing devices 12(1)-12(n).

In step 315, the mobile application manager device 13 determines when the requesting one of the plurality of mobile computing devices 12(1)-12(n) can be authenticated based on the received user credentials and the obtained information associated with the requesting one of the plurality of mobile computing devices 12(1)-12(n). By way of example only, mobile application manager device 13 compares the stored information and security policies with the received user credentials and information associated with the requesting one of the plurality of mobile computing devices 12(1)-12(n) to determine when the requesting one of the plurality of mobile computing devices 12(1)-12(n) can be authenticated, although the mobile application manager device 13 can use other techniques and parameters to make the determination. Accordingly, when the mobile application manager device 13 determines that the requesting one of the plurality of mobile computing devices 12(1)-12(n) should not be authenticated, then the No branch is taken to step 335 where exemplary method ends.

However, when the mobile application manager computing device 13 determines that the requesting one of the plurality of mobile computing devices 12(1)-12(n) can be authenticated, then the Yes branch is taken to step 320.

Next in step 320, the mobile application manager device 13 stores the received user credentials and the obtained information associated with the requesting one of the plurality of mobile computing devices 12(1)-12(n) within memory in the mobile application manager device 13, although the mobile application manager device 13 can store the registration information at other memory locations. Additionally, the mobile application manager device 13 assigns administrator assigned policies and mobile applications to the enrolled and authenticated requesting one of the plurality of mobile computing devices 12(1)-12(n). Optionally, the mobile application manager device 13 can send an acknowledgement back to the requesting one of the plurality of mobile computing devices 12(1)-12(n) confirming the authentication.

Next in step 325, the mobile application manager computing device 13 sets up a compliance check on a periodic basis on the enrolled and authenticated requesting one of the plurality of mobile computing devices 12(1)-12(n). In this example, the compliance check relates to determining the group assigned to the user of requesting one of the plurality of mobile computing devices 12(1)-12(n) based on the users role within an organization, determining the mobile applications installed on the requesting one of the plurality of mobile computing devices 12(1)-12(n), the mobile security or privacy information associated with the requesting one of the plurality of mobile computing devices 12(1)-12(n), although compliance check can relate to other types of checks.

In step 330, the mobile application manager device 13 during the compliance check obtains information associated with the requesting one of the plurality of mobile computing devices 12(1)-12(n) and stores the obtained information locally within the mobile application manager computing device 13, although the mobile application manager computing device 13 can store other types of information at other memory locations. In this example, the mobile application manager computing device 13 obtains the current information associated with the requesting one of the plurality of mobile computing devices 12(1)-12(n) such as assigned group, geographical location of the requesting one of the plurality of mobile computing devices 12(1)-12(n), type of requesting one of the plurality of mobile computing devices 12(1)-12(n), version of software executing on the requesting one of the plurality of mobile computing devices 12(1)-12(n), or type of web browser on the requesting one of the plurality of mobile computing devices 12(1)-12(n), although the mobile application manager device 13 can obtain other types or amounts of information associated with the plurality of mobile computing devices 12(1)-12(n).

Figure 4:
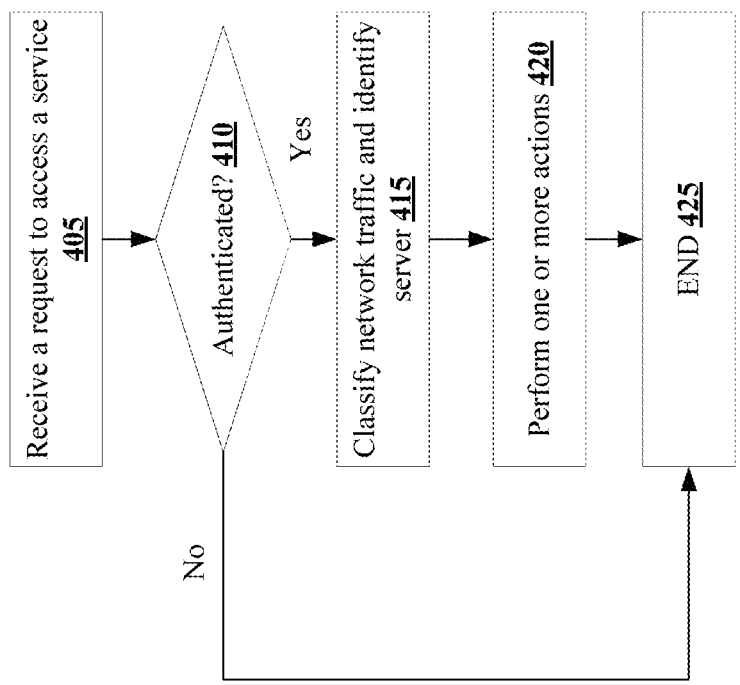
FIG. 4 is an exemplary flowchart of a method for managing L7 network traffic classification.

Next, an example of a method for classifying L7 traffic using enrollment data associated with an enrolled mobile computing device will now be described with reference to FIGS. 4 and 6. In this particular example the method beings at step 405 with the access manager computing device 14 receiving a request from one of the plurality of mobile computing devices 12(1)-12(n) to access a service stored within the plurality of web application servers 16(1)-16(n), although the access manager computing device 14 can receive other types of requests. In this example, the access manager computing device 14 also receives the enrollment data associated with the user of the requesting one of the plurality of mobile computing devices 12(1)-12(n) and also the information associated with the requesting one of the plurality of mobile computing devices 12(1)-12(n). By way of example only, the information associated with the user of the requesting one of the plurality of mobile devices 12(1)-12(n) can relate to the username, password, title or designation within an organization and/or other unique identification numbers, although the information associated with the user can include other types or amounts of information associated with the user. As illustrated above, information associated with the requesting one of the plurality of mobile computing devices 12(1)-12(n) relates to a type of the requesting one of the plurality of mobile computing devices 12(1)-12(n), a version of the operating system executing on the requesting one of the plurality of mobile computing devices 12(1)-12(n), a type or types of mobile applications executing on the requesting one of the plurality of mobile computing devices 12(1)-12(n), a type or types of web browser on the requesting one of the plurality of mobile computing devices 12(1)-12(n), and/or one or more security policies on the requesting one of the plurality of mobile computing devices 12(1)-12(n).

Upon receiving the request, the access manager computing device 14 in step 410 determines whether the user using the requesting one of the plurality of mobile computing devices 12(1)-12(n) is authenticated to access the requested service stored in the plurality of web application servers 16(1)-16(n) by interacting with the mobile application manager computing device 13, although the access manager computing device can determine using other techniques. In this example, the access manager computing device 13 determines whether the user using the requested one of the plurality of mobile computing devices 12(1)-12(n) is authenticated using the information associated with the user and the information associated with the requesting one of the plurality of mobile computing devices 12(1)-12(n), although the access manager computing device 14 can make the determination using other parameters. Accordingly, when the access manager computing device 14 determines that the user of the requesting one of the plurality of mobile computing devices 12(1)-12(n) is not authenticated, then the No branch is taken to step 425 where the exemplary method ends.

Alternatively in another example, the access manager computing device 14 can use either one of the user information or the information associated with the requesting one of the plurality of mobile computing devices 12(1)-12(n) to determine whether the user associated with the requesting one of the plurality of mobile computing devices 12(1)-12(n) has been authenticated to access the requested service. Alternatively in yet another example, when the access manager computing device 14 determines that the user of the requesting one of the plurality of mobile computing devices is not authenticated, the access manager computing device 14 redirects the requesting one of the plurality of mobile computing devices 12(1)12-(n) to complete the enrollment and authentication as previously illustrated above in FIGS. 3 and 5.

However, when the access manager computing device 14 determines that the user of the requesting one of the plurality of mobile computing devices has been authenticated, then the Yes branch is taken to step 415.

In step 415, the access manager computing device 14 classifies the network traffic based on the information associated with the requesting one of the plurality of mobile computing devices 12(1)-12(n). By way of example only, the access manager computing device 14 can classify the network traffic coming from the requesting one of the plurality of mobile computing devices 12(1)-12(n) when the requesting one of the plurality of mobile computing devices 12(1)-12(n) has a particular version of the web browser, requested application, version of the requested application, port number of the received request or type of device or the version of the software and mobile applications executing on the requesting one of the plurality of mobile computing devices 12(1)-12(n). Additionally, the access manager computing device 14 can identify application protocol information associated with the mobile application executing on the requesting one of the plurality of mobile computing devices 12(1)-12(n) requesting to access the service. By way of example only, the application protocol information relates to type, version, port number associated with the requested application, although the application protocol information can include other types or amounts of information associated with the requested application. In this example, the access manager computing device 14 obtains this information based on the interaction with the mobile application manager device 13, although the access manager computing device can obtain information from other devices using other techniques.

Next in step 420, upon classifying the traffic coming from the requesting one of the plurality of mobile computing devices, the access manager computing device 14 performs one or more actions based on the classification. By way of example only, the access manager computing device 14 manages the network traffic to the plurality of web application servers 16(1)-16(n) by selecting one of the plurality of web application servers based on the version of the software executing on the requesting one of the plurality of the mobile computing devices 12(1)-12(n), although the access manager computing device 14 perform other types or amounts of actions using other parameters or techniques. Alternatively other examples of the one or more actions include, installing, editing or deleting mobile applications or security profiles, although the access manager computing device 14 can perform other types and numbers of different operations.

Once the access manager computing device 14 identifies one of the plurality of web application servers 16(1)-16(n), the access manager computing device establishes the connection between the requesting one of the plurality of mobile computing devices 12(1)-12(n) and identified one of the plurality of web application servers 16(1)-16(n). With the established connection, the user using the requesting one of the plurality of mobile computing devices 12(1)-12(n) can access the requested service residing in the identified one of the plurality of web application servers 16(1)-16(n) and this example of the method ends at step 425.

Having thus described the basic concept of the disclosed technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the disclosed technology. Additionally, the recited order of processing elements or sequences, or the use of numbers, letters, or other designations therefore, is not intended to limit the claimed processes to any order except as may be specified in the claims. Accordingly, the disclosed technology is limited only by the following claims and equivalents thereto.

What is claimed is:

1. A method implemented by a network traffic management system comprising one or more network traffic apparatuses, client devices, or server devices, the method comprising:
   receiving an enrollment request from a mobile computing device at a mobile application manager computing device;
   authenticating the enrollment request using the mobile application manager computing device;
   assigning policies to the mobile computing device using the mobile application manager computing device;
   periodically run compliance checks on the mobile computing device to determine mobile applications installed on the mobile computing device;
   storing, on the mobile application manager computing device, information describing the mobile applications installed on the mobile computing device;
   receiving a request to access an application from the mobile computing device at an access manager computing device;
   in response to receiving the application access request from the mobile computing device, obtaining, using the access manager computing device, the policies assigned to the mobile computing device and the information describing the mobile applications installed on the mobile computing device from the mobile application manager computing device;
   classifying the request to access the application using the policies assigned to the mobile computing device and the information describing the mobile applications installed on the mobile computing device;
   selecting an application server from a plurality of application servers based on the classification; and
   providing the mobile computing device with the requested access to the application executing on the selected application server.

2. The method as set forth in claim 1, wherein the classifying is further based on application protocol information associated with an authenticated client of the mobile computing device.

3. The method as set forth in claim 1 further comprising redirecting a client to complete an authentication before providing access to the application.

4. A non-transitory computer readable medium having stored thereon instructions comprising machine executable code which when executed by at least one processor, causes the processor to:
   receive an enrollment request from a mobile computing device at a mobile application manager computing device;
   authenticate the enrollment request using the mobile application manager computing device;
   assign policies to the mobile computing device using the mobile application manager computing device;
   periodically run compliance checks on the mobile computing device to determine mobile applications installed on the mobile computing device;
   store, on the mobile application manager computing device, information describing the mobile applications installed on the mobile computing device;
   receive a request to access an application from the mobile computing device at an access manager computing device;
   in response to receiving the application access request from the mobile computing device, obtain, using the access manager computing device, the policies assigned to the mobile computing device and the information describing the mobile applications installed on the mobile computing device from the mobile application manager computing device;
   classify the request to access the application using the policies assigned to the mobile computing device and the information describing the mobile applications installed on the mobile computing device;
   select an application server from a plurality of application servers based on the classification; and
   provide the mobile computing device with the requested access to the application executing on the selected application server.

5. The medium as set forth in claim 4, wherein the classifying is further based on application protocol information associated with an authenticated client of the mobile computing device.

6. The medium as set forth in claim 4 further comprising redirecting a client to complete an authentication before providing access to the application.

7. A network traffic management system, comprising one or more traffic management apparatuses, client devices, or server devices, the network traffic management system comprising memory comprising programmed instructions stored thereon and one or more processors configured to be capable of executing the stored programmed instructions to:
   receive an enrollment request from a mobile computing device at a mobile application manager computing device;
   authenticate the enrollment request using the mobile application manager computing device;
   assign policies to the mobile computing device using the mobile application manager computing device;
   periodically run compliance checks on the mobile computing device to determine mobile applications installed on the mobile computing device;
   store, on the mobile application manager computing device, information describing the mobile applications installed on the mobile computing device;
   receive a request to access an application from the mobile computing device at an access manager computing device;
   in response to receiving the application access request from the mobile computing device, obtain, using the access manager computing device, the policies assigned to the mobile computing device and the information describing the mobile applications installed on the mobile computing device from the mobile application manager computing device;
classify the request to access the applications using the policies assigned to the mobile computing device and the information describing the mobile applications installed on the mobile computing device;
select an application server from a plurality of applications servers based on the classification; and
provide the mobile computing device with the requested access to the application executing on the selected application server.

8. The network traffic management system of claim 7, wherein the classifying is further based on application protocol information associated with an authenticated client of the mobile computing device.

9. The network traffic management system of claim 7, further comprising redirecting a client to complete an authentication before providing access to the application.

* * * * *